(12) United States Patent
Kambe

(10) Patent No.: US 8,623,951 B2
(45) Date of Patent: Jan. 7, 2014

(54) SILICON NANOPARTICLE DISPERSIONS

(75) Inventor: Nobuyuki Kambe, Menlo Park, CA (US)

(73) Assignee: NanoGram Corporation, Milpitas, CA (US)

( * ) Notice: Subject to any disclaimer, the term of this patent is extended or adjusted under 35 U.S.C. 154(b) by 0 days.

(21) Appl. No.: 13/594,345

(22) Filed: Aug. 24, 2012

(65) Prior Publication Data

US 2012/0319053 A1    Dec. 20, 2012

Related U.S. Application Data

(63) Continuation of application No. 12/898,160, filed on Oct. 5, 2010, which is a continuation of application No. 11/796,483, filed on Apr. 27, 2007, now Pat. No. 7,816,439, which is a continuation of application No. 10/083,967, filed on Feb. 25, 2002, now Pat. No. 7,226,966.

(60) Provisional application No. 60/309,887, filed on Aug. 3, 2001.

(51) Int. Cl.
*C08K 3/34* (2006.01)

(52) U.S. Cl.
USPC ............ 524/442; 423/348; 423/349; 524/443

(58) Field of Classification Search
USPC .......................... 524/442, 443; 423/348, 349
See application file for complete search history.

(56) References Cited

U.S. PATENT DOCUMENTS

| | | | |
|---|---|---|---|
| 3,645,939 A | 2/1972 | Gaylord | |
| 4,071,494 A | 1/1978 | Gaylord | |
| 4,317,762 A | 3/1982 | Kratel et al. | |
| 4,330,358 A | 5/1982 | Grabmaier et al. | |
| 4,390,743 A | 6/1983 | Dahlberg | |
| 4,425,384 A | 1/1984 | Brownscombe | |
| 4,478,963 A | 10/1984 | McGarry | |
| 4,786,477 A | 11/1988 | Yoon et al. | |
| 4,828,695 A | 5/1989 | Yamamura et al. | |
| 4,947,219 A | 8/1990 | Boehm | |
| 4,972,008 A | 11/1990 | Lee et al. | |
| 5,132,248 A | 7/1992 | Drummond et al. | |
| 5,262,357 A | 11/1993 | Alivisatos et al. | |
| 5,372,749 A | 12/1994 | Li et al. | |
| 5,374,413 A | 12/1994 | Kim et al. | |
| 5,429,708 A | 7/1995 | Linford et al. | |
| 5,489,449 A | 2/1996 | Umeya et al. | |
| 5,491,114 A | 2/1996 | Goldstein | |
| 5,559,057 A | 9/1996 | Goldstein | |
| 5,576,248 A | 11/1996 | Goldstein | |
| 5,695,617 A | 12/1997 | Gravier et al. | |
| 5,850,064 A | 12/1998 | Goldstein | |
| 5,858,541 A | 1/1999 | Hiraoka et al. | |
| 5,866,471 A | 2/1999 | Beppu et al. | |
| 5,965,299 A | 10/1999 | Khan et al. | |
| 6,007,869 A | 12/1999 | Schreider et al. | |
| 6,086,945 A | 7/2000 | Kamata et al. | |
| 6,100,464 A | 8/2000 | Priesemuth | |
| 6,136,905 A | 10/2000 | Suzuki et al. | |
| 6,268,041 B1 | 7/2001 | Goldstein | |
| 6,281,427 B1 | 8/2001 | Mitsuhiro et al. | |
| 6,287,925 B1 | 9/2001 | Yu | |
| 6,348,295 B1 | 2/2002 | Griffith et al. | |
| 6,403,382 B1 | 6/2002 | Zhu et al. | |
| 6,416,721 B1 | 7/2002 | Sanjurjo et al. | |
| 6,476,098 B1 | 11/2002 | Arakawa et al. | |
| 6,531,191 B1 | 3/2003 | Notenboom | |
| 6,552,405 B2 | 4/2003 | Sugawara et al. | |
| 6,585,947 B1 | 7/2003 | Nayfeh et al. | |
| 6,586,785 B2 | 7/2003 | Flagan et al. | |
| 6,599,631 B2 | 7/2003 | Kambe et al. | |
| 6,712,999 B2 | 3/2004 | Haering et al. | |
| 6,794,265 B2 | 9/2004 | Lee et al. | |
| 6,846,565 B2 | 1/2005 | Korgel et al. | |
| 6,849,334 B2 | 2/2005 | Horne et al. | |
| 6,878,184 B1 | 4/2005 | Rockenberger et al. | |
| 6,881,490 B2 | 4/2005 | Kambe et al. | |
| 6,911,385 B1 | 6/2005 | Haubrich et al. | |
| 6,918,946 B2 | 7/2005 | Korgel et al. | |

(Continued)

FOREIGN PATENT DOCUMENTS

EP    0018634    11/1980
EP    1054035    11/2000

(Continued)

OTHER PUBLICATIONS

Goldstein et al., "Observation of Melting in 30 Å Diameter CdS Nanocrystals", Mat. Res. Sco. Symp. Proc., 206:271-274 (1991).

(Continued)

*Primary Examiner* — Edward Cain
(74) *Attorney, Agent, or Firm* — Dardi & Herbert, PLLC; Peter S. Dardi; Nikhil Patel

(57) ABSTRACT

Polymer-inorganic particle blends are incorporated into structures generally involving interfaces with additional materials that can be used advantageously for forming desirable devices. In some embodiments, the structures are optical structures, and the interfaces are optical interfaces. The different materials at the interface can have differences in index-of-refraction to yield desired optical properties at the interface. In some embodiments, structures are formed with periodic variations in index-of-refraction. In particular, photonic crystals can be formed. Suitable methods can be used to form the desired structures.

20 Claims, 15 Drawing Sheets

(56) References Cited

U.S. PATENT DOCUMENTS

| | | |
|---|---|---|
| 6,998,288 B1 | 2/2006 | Smith et al. |
| 7,001,578 B2 | 2/2006 | Nayfeh et al. |
| 7,029,632 B1 | 4/2006 | Weidhaus et al. |
| 7,038,655 B2 | 5/2006 | Herb et al. |
| 7,045,851 B2 | 5/2006 | Black et al. |
| 7,057,206 B2 | 6/2006 | Halik et al. |
| 7,067,069 B2 | 6/2006 | Shiho et al. |
| 7,067,337 B2 | 6/2006 | Yudasaka et al. |
| 7,078,276 B1 | 7/2006 | Zarcher et al. |
| 7,135,350 B1 | 11/2006 | Smith et al. |
| 7,173,180 B2 | 2/2007 | Shiho et al. |
| 7,229,859 B2 | 6/2007 | Yudasaka et al. |
| 7,267,721 B2 | 9/2007 | Kauzlarich et al. |
| 7,384,680 B2 | 6/2008 | Bi et al. |
| 7,473,443 B2 | 1/2009 | Matsuki et al. |
| 7,521,340 B2 | 4/2009 | Lemmi et al. |
| 7,575,784 B1 | 8/2009 | Bi et al. |
| 7,615,393 B1 | 11/2009 | Shah et al. |
| 7,852,435 B2 | 12/2010 | Fujiwara et al. |
| 7,943,721 B2 | 5/2011 | Dioumaev |
| 2002/0074547 A1 | 6/2002 | Yudasaka et al. |
| 2003/0003300 A1* | 1/2003 | Korgel et al. ............ 428/402 |
| 2003/0031438 A1 | 2/2003 | Kambe et al. |
| 2003/0045632 A1 | 3/2003 | Shiho et al. |
| 2005/0008880 A1 | 1/2005 | Kunze et al. |
| 2005/0145163 A1 | 7/2005 | Matsuki et al. |
| 2005/0170192 A1 | 8/2005 | Kambe et al. |
| 2006/0094189 A1 | 5/2006 | Zurcher et al. |
| 2006/0137567 A1 | 6/2006 | Yadav |
| 2006/0157677 A1 | 7/2006 | Kunze et al. |
| 2006/0237719 A1 | 10/2006 | Colfer et al. |
| 2007/0003694 A1 | 1/2007 | Chiruvolu et al. |
| 2007/0094757 A1 | 4/2007 | Pridohl et al. |
| 2008/0083926 A1 | 4/2008 | Ostergard |
| 2008/0138966 A1 | 6/2008 | Rogojina et al. |
| 2008/0152938 A1 | 6/2008 | Kelman et al. |
| 2008/0171425 A1 | 7/2008 | Poplavskyy et al. |
| 2008/0191193 A1 | 8/2008 | Li et al. |
| 2008/0202576 A1 | 8/2008 | Hieslmair |
| 2008/0220175 A1 | 9/2008 | Mangolini et al. |
| 2008/0305619 A1 | 12/2008 | Lemmi et al. |
| 2009/0026421 A1 | 1/2009 | Li et al. |
| 2009/0263977 A1 | 10/2009 | Rogojina et al. |
| 2009/0269913 A1 | 10/2009 | Terry et al. |
| 2012/0012032 A1 | 1/2012 | Bi et al. |
| 2013/0012636 A1 | 1/2013 | Kambe et al. |

FOREIGN PATENT DOCUMENTS

| | | |
|---|---|---|
| JP | 48-010612 | 4/1973 |
| JP | 63-210661 | 9/1988 |
| JP | 64-026640 | 1/1989 |
| JP | 03-095269 | 4/1991 |
| JP | 05-254883 | 10/1993 |
| JP | 05-261267 | 10/1993 |
| JP | 06-091162 | 4/1994 |
| JP | 06-142496 | 5/1994 |
| JP | 07-008792 | 1/1995 |
| JP | 09-272706 | 10/1997 |
| JP | 10-45409 A | 2/1998 |
| JP | 11-171947 | 6/1999 |
| JP | 2000-026692 | 1/2000 |
| JP | 2000-219901 | 8/2000 |
| JP | 2000-279817 | 10/2000 |
| JP | 2000-282222 | 10/2000 |
| JP | 2000-327930 | 11/2000 |
| JP | 2001-011119 | 1/2001 |
| WO | 2005/013337 | 2/2005 |
| WO | 2005/049492 | 6/2005 |
| WO | 2006/009881 | 1/2006 |
| WO | 2007/023362 | 3/2007 |
| WO | 2007/072162 | 6/2007 |
| WO | 2007/117265 | 10/2007 |
| WO | 2008/030966 | 3/2008 |
| WO | 2008/039757 | 4/2008 |
| WO | 2008/061131 | 5/2008 |
| WO | 2008/073763 | 6/2008 |
| WO | 2008/091393 | 7/2008 |
| WO | 2008/118865 | 10/2008 |
| WO | 2008/137738 | 11/2008 |
| WO | 2008/143716 | 11/2008 |
| WO | 2008/152272 | 12/2008 |
| WO | 2009/032359 | 3/2009 |
| WO | 2009/114026 | 9/2009 |
| WO | 2009/117007 | 9/2009 |

OTHER PUBLICATIONS

Cannon et al, "Sinterable Ceramic Powders from Laser-Driven Reaction: I, Process Description and Modeling," J. Am. Ceramic Society 65 (7):324-329 (1982).

Cannon et al, "Sinterable Ceramic Powders from Laser-Driven Reaction: II, Powder Characteristics and Process Variables," J. Am. Ceramic Society 65(7):330-335 (1982).

Thomas, "The Determination of Log Normal Particle Size Distributions by Dynamic Light Scattering", Journal of Colloid and Interface Science, 117(1):187-192 (May 1987).

* cited by examiner

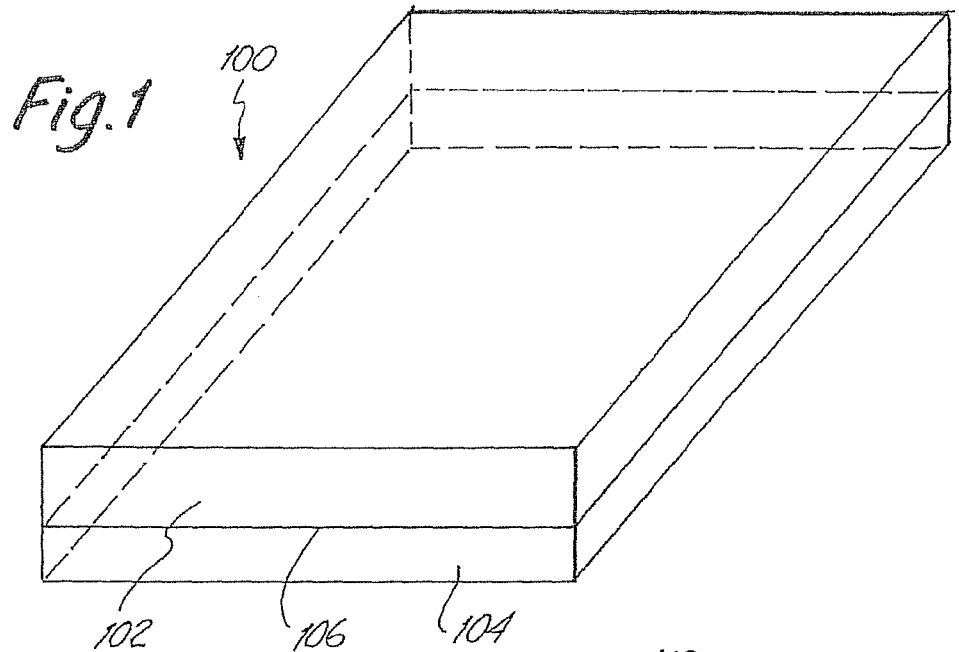
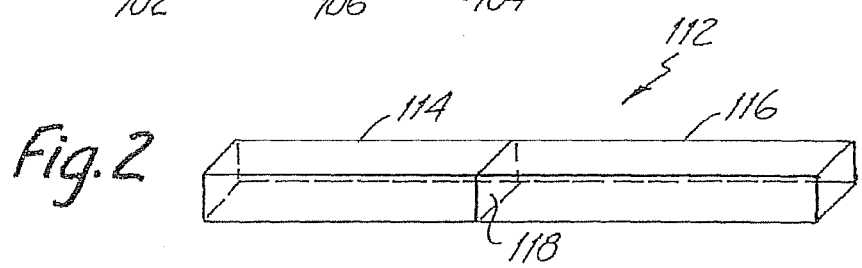
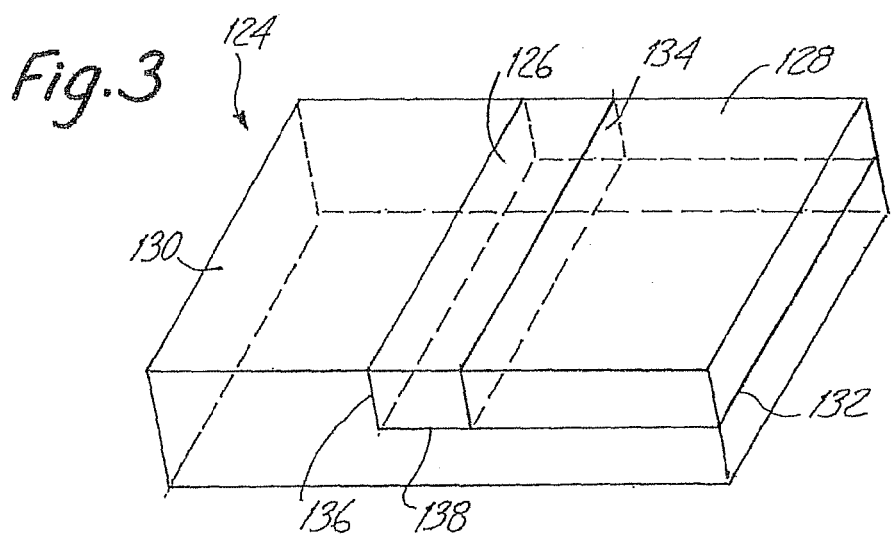

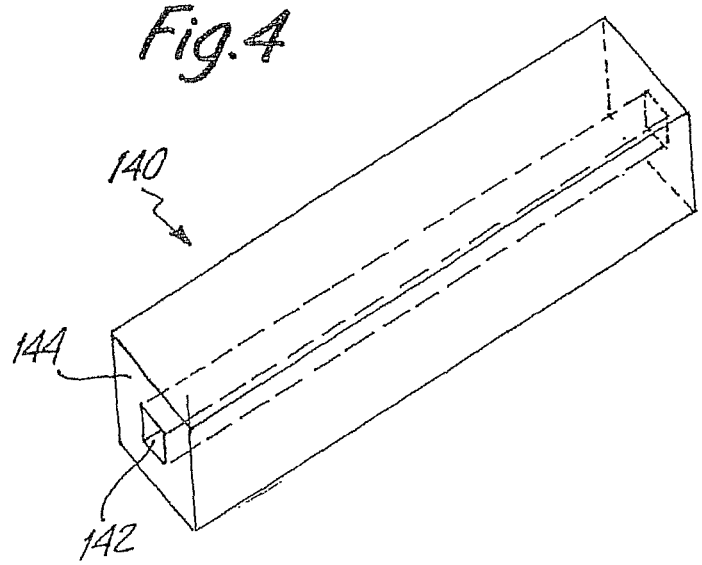
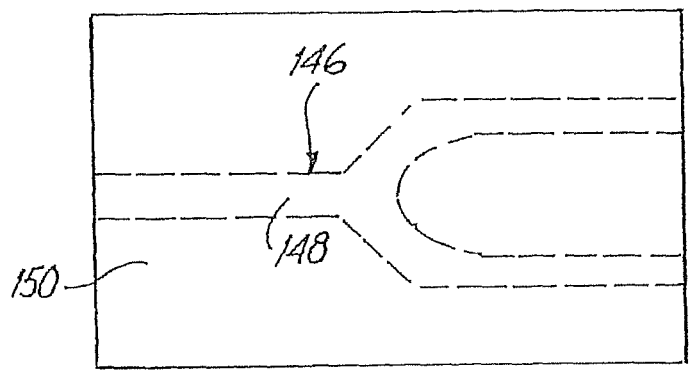
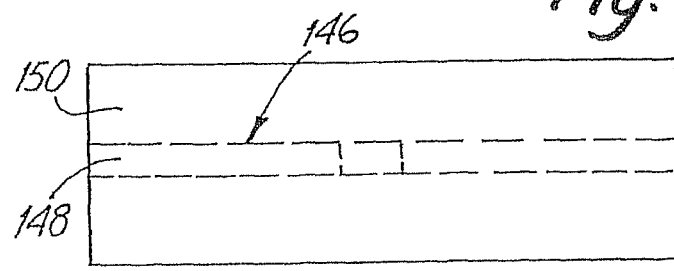

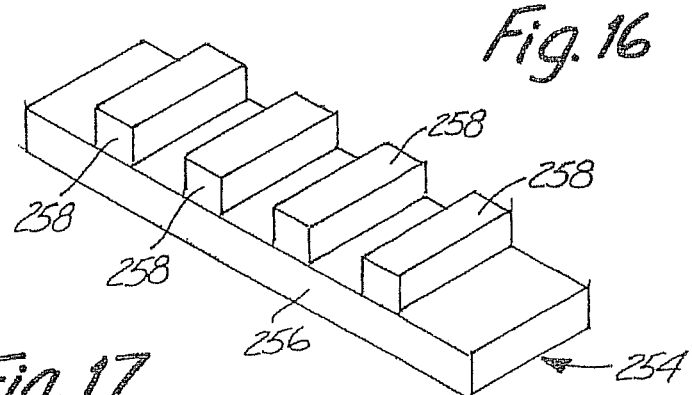
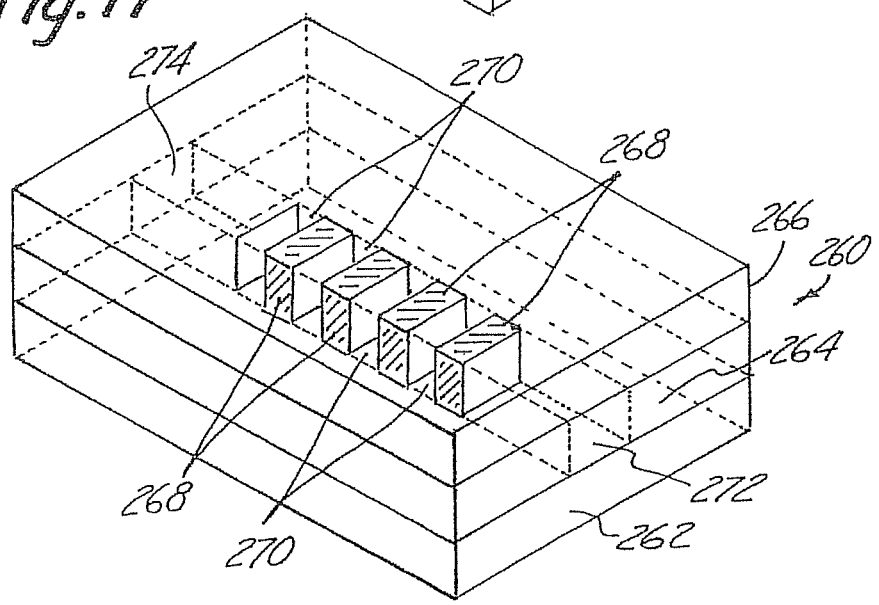
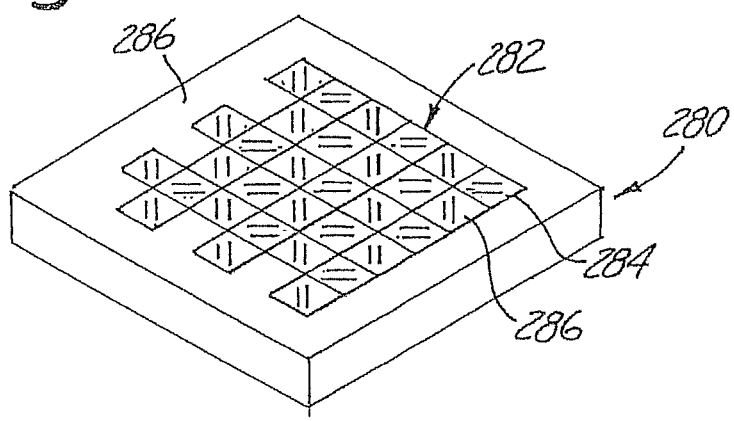

SILICON NANOPARTICLE DISPERSIONS

CROSS REFERENCE TO RELATED APPLICATIONS

This patent application is a continuation of U.S. patent application Ser. No. 12/898,160, filed Oct. 5, 2010, to Kambe et. al., entitled "Structures Incorporating Polymer-Inorganic Particle Blends," which is a continuation of U.S. patent application Ser. No. 11/796,483, filed Apr. 27, 2007, now U.S. Pat. No. 7,816,439 to Kambe et al., entitled "Structures Incorporating Polymer-Inorganic Particle Blends," which is a continuation of U.S. patent application Ser. No. 10/083,967, filed on Feb. 25, 2002, now U.S. Pat. No. 7,226,966, which claims priority to U.S. Provisional Patent application Ser. No. 60/309,887 filed Aug. 3, 2001, to Kambe et al., entitled "Index-Engineering With Nano-Polymer Composites," incorporated herein by reference.

FIELD OF THE INVENTION

The invention relates to structures formed with polymer-inorganic particle blends, including polymer-inorganic particle composites with bonding between the particles and the polymer. The invention further relates to processing approaches, such as self-assembly, for the formation of structures from polymer-inorganic particle blends. In addition, the invention relates to devices formed from the polymer-inorganic particle blends, in particular optical devices, such as photonic crystals.

BACKGROUND OF THE INVENTION

Advances in a variety of fields have created uses for many types of new materials. In particular, a variety of chemical powders can be used in many different processing contexts. Inorganic powders can introduce desired functionality in various contexts. Similarly, polymers can be used to form a variety of devices in many fields. Various polymers are available to provide desired properties and/or functionalities for the appropriate application as well as providing versatility in processing.

Furthermore, technological advances have increased interest in improved material processing with strict tolerances on processing parameters. As miniaturization continues even further, material parameters will need to fall within stricter tolerances. Current integrated circuit technology already requires tolerances on processing dimensions on a submicron scale. The consolidation or integration of mechanical, electrical and optical components into integral devices has created further constraints on material processing. Composite materials can be used to combine desirable properties and/or processing capabilities of different materials to obtain improved materials and performances.

An explosion of communication and information technologies including interne based systems has motivated a world wide effort to implement optical communication networks to take advantage of a large bandwidth available with optical communication systems. Optical communication systems incorporate optical fibers for transmission and may include, for example, planar optical structures for manipulating optical signals in a smaller footprint. Formation of optical devices has been based alternatively on polymers or on inorganic materials, such as silica glasses.

SUMMARY OF THE INVENTION

In a first aspect, the invention pertains to an optical structure comprising an interface between a first optical material and a second optical material each of which comprises a polymer. The first optical material comprises a polymer-inorganic particle blend, wherein the blend comprises inorganic particles that, when isolated, are electrical insulators or electrical conductors.

In another aspect, the invention pertains to a structure comprising an interface between a first material and a second material each of which comprises a polymer. The first material comprises a polymer-inorganic particle composite. The composite comprises inorganic particles that are electrical semiconductors or electrical conductors, and the inorganic particles have an average particle size of no more than about 1 micron.

In a further aspect, the invention pertains to a material comprising a polymer-inorganic particle blend. The blend comprises inorganic particle that are electrically conducting, and the blend is transparent to visible light at a thickness of 100 microns.

In an additional aspect, the invention pertains to a reflective display comprising liquid crystal dispersed within a polymer-inorganic particle blend. The polymer-inorganic particle blend is an optical material.

Furthermore, the invention pertains to an interconnected optical structure comprising a first optical channel, a second optical channel and an optical interconnect optically connecting the first optical channel and the second optical channel. The optical interconnect comprises a polymer-inorganic particle blend.

Also, the invention pertains to a periodic structure comprising approximately periodic index-of-refraction variation. The structure comprises a first polymer-inorganic particle blend and a second optical material interspersed between regions with the polymer-inorganic particle blend. The second optical material is selected from the group consisting of a second polymer-inorganic particle blend, a polymer and a non-polymer inorganic material.

In other aspects, the invention pertains to a photonic crystal structure comprising a periodic array of a polymer-inorganic particle blend that is interspersed with an optical material.

In further embodiments, the invention pertains to an optical structure comprising an interface between a uniform optical inorganic materials and an optical polymer-inorganic particle blend. The blend comprises inorganic particles that are electrical insulators or electrical conductors.

In addition, the invention pertains to a display device comprising a layer of an optical polymer-inorganic particle blend that forms a visible portion of the display. The blend comprises inorganic particles that are electrical insulators or electrical conductors.

In additional aspect, the invention pertains to an optical device comprising a polymer-inorganic particle blend wherein the blend comprises inorganic particles that exhibit non-linear optical properties.

Furthermore, the invention pertains to a light absorbing device comprising a first electrode and a polymer-inorganic particle blend arranged in a periodic structure. The periodic structure absorbs electromagnetic radiation at a desired frequency.

Also, the invention pertains to an electromechanical structure comprising a pair of electrodes and a polymer-inorganic particle composite. Application of a voltage to the electrodes results in a deflection of a portion of the electromechanical structure.

In other aspects, the invention pertains to a method for producing an interface between a first material and a second material with each material comprising a polymer and with at least one of the materials comprising a polymer-inorganic particle blend. The method comprises coextruding a first optical material in contact with a second optical material to form an interface between the first material and the second material.

In further aspects, the invention pertains to a method for producing an interface between a first material and a second material with each material comprising a polymer and with at least one of the materials comprising a polymer-inorganic particle blend. The method comprises spin-coating the first material on top of a layer of the second material to form an interface between the first material and the second material. The first material does not dissolve the second material in the time frame of the spin coating process.

In another aspect, the invention pertains to a method for producing an interface between two optical materials differing in value of index-of-refraction between each other by at least about 0.005. The method comprises implementing a self-assembly process with a polymer/inorganic particle blend to form a first optical material and locating a second optical material in contact with the blend to form the interface.

BRIEF DESCRIPTION OF THE DRAWINGS

FIG. 1 is a schematic perspective view of a planar interface between a polymer-inorganic particle blend and a second material.

FIG. 2 is a schematic perspective view of an interface along an edge between a polymer-inorganic particle blend and a second material.

FIG. 3 is a schematic perspective view of a structure with various interfaces between three materials.

FIG. 4 is a perspective view of a representative waveguide structure.

FIG. 5 is a top view of a planar optical structure with an optical coupler/splitter within the structure noted with phantom lines.

FIG. 6 is a side view of the optical structure of FIG. 5.

FIG. 16 is a perspective view of a structure with a periodic array of bars of polymer-inorganic particle blends.

FIG. 17 is an optical structure with a periodic array of higher index-of-refraction material within the optical structure.

FIG. 18 is a perspective view of an optical structure with a two dimensional array of higher index-of-refraction material, which can be a portion of a larger optical structure.

DETAILED DESCRIPTION OF THE INVENTION

Figure 7A:
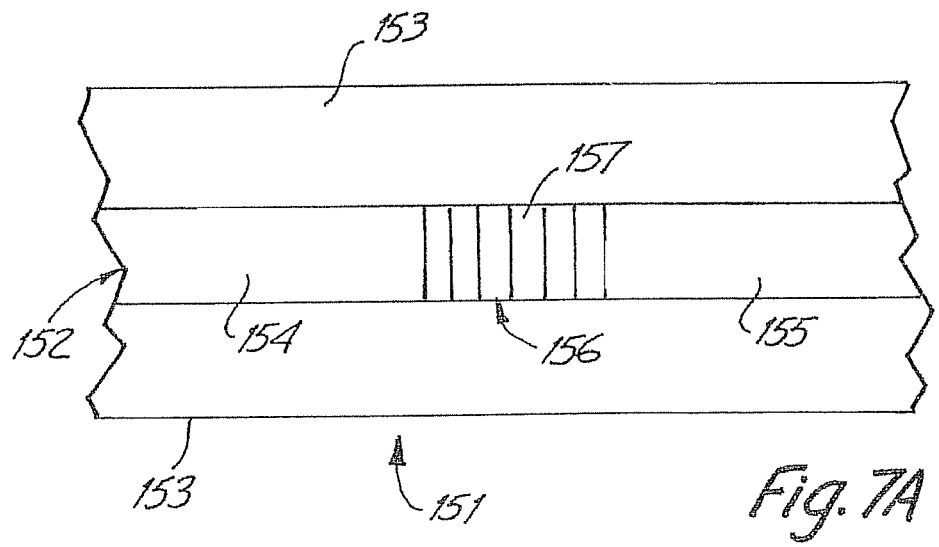
FIG. 7A is a sectional view of an interconnect with a step-wise change in index-of-refraction.

Versatile materials and structures can be formed from blends comprising polymers and inorganic particles. In particular, a polymer-inorganic particle blend can be combined with another material, which may or may not be another blend, to form structures with appropriate interfaces between the different materials. Inorganic powders and corresponding polymer-inorganic particle blends can be used in the production of devices, such as flat panel displays, electronic circuits, optical and electro-optical materials, optical devices and integrated optical circuits. In some embodiments, the polymers and the inorganic particles are chemically bonded to stabilize the resulting composite. For the formation of optical materials and optical structures, the polymer-inorganic particle blend materials have optical properties based on the components of the optical materials. In general, by selecting the compositions and particle loadings, the properties, such as optical properties, of the blend can be correspondingly selected. Desirable optical structures may involve interfaces between the polymer/inorganic-particle blends and another polymer material, such as another polymer-inorganic particle blend, or a uniform inorganic material, such as an optical glass. Specifically, optical structures generally involve interfaces between optical materials with differing optical properties, e.g., index-Various processing approaches can be used effectively to form desired optical structures. Optical and non-optical devices can be formed advantageously that incorporate the polymer-inorganic particle blends. Some structures of interest have a period variation in materials with one or more of the materials being a polymer-inorganic particle blend.

Polymer-inorganic particle blends can be used to engineer processable materials with wide ranges of properties, such as index-of-refraction. In addition to having versatility with respect to functional properties, polymer-inorganic particle blends can have desirable mechanical properties, such as durability. A range of polymers are suitable for incorporation into the composites, including both organic polymers and inorganic polymers, such as polysiloxanes. The inorganic particles generally include metal or metalloid elements in their elemental form or in compounds. Specifically, the inorganic particles can include, for example, elemental metal or elemental metalloid, i.e. un-ionized elements, metal/metalloid oxides, metal/metalloid nitrides, metal/metalloid carbides, metal/metalloid sulfides, metal/metalloid silicates, metal/metalloid phosphates or combinations thereof. As used herein, inorganic particles include carbon particles, such as fullerenes, carbon black, graphite and combinations thereof. Inorganic particles excluding carbon particles can be referred to as non-carbon inorganic particles. Metalloids are elements that exhibit chemical properties intermediate between or inclusive of metals and nonmetals. Metalloid elements include silicon, boron, arsenic, antimony, and tellurium. While phosphorous is located in the periodic table near the metal elements, it is not generally considered a metalloid element. However, $P_2O_5$ and doped forms of $P_2O_5$ are good optical materials similar to some metalloid oxides, and other optical materials doped with phosphorous, e.g., in the form of $P_2O_5$, can have desirable optical properties. For convenience, as used herein including in the claims, phosphorous is also considered a metalloid element.

The inorganic particles can be incorporated at a range of loadings into the blends. High inorganic particle loadings of up to about 50 weight percent or greater can be achieved with well dispersed particles. In addition, in embodiments involving chemically bonded composites, the amount of the linker compounds bonded to the inorganic particles can be adjusted to vary the degree of crosslinking obtained with the polymer.

In some aspects of the invention, polymer inorganic-particle blends comprise polymer-inorganic particle composites with chemical bonding between the inorganic particles and the polymer. In other embodiments, the blends comprise mixtures of inorganic particles and polymers. The composition of the components of the blends and the relative amounts of the components can be selected to yield desired properties, such as optical properties.

In embodiments of the polymer-inorganic particle blends involving chemical bonding between the polymer and the inorganic particles, the polymer is selected or modified to include appropriate functional groups to chemically bond with the inorganic particles or with functional groups of a linker compound. A linker compound can facilitate the formation of the resulting composite. Specifically, in these embodiments, the composites include a monomer/polymer component, inorganic particles, and linker compounds that bridge the inorganic particles and the monomer/polymer. In the case of monomer units being joined to the linker compound, a polymer is formed with the formation of the composite. For simplicity in notation, the monomer/polymer unit joined with the linker and assembled into the composite will be referred to generally as a polymer, although it is recognized that in some cases the unit can be a monomer or polymer, such as a dimer, trimer or larger polymer structures. The molecular weights of the polymers can be selected to vary the properties of the resulting composite.

In some embodiments, it may be advantageous to use collections of inorganic particles having an average diameter of less than about 500 nanometers (nm). Suitable nanoparticles can be formed, for example, by flame synthesis, combustion, or sol gel approaches. Methods for synthesizing inorganic particles with particular high uniformity include radiation-based pyrolysis/laser pyrolysis in which light from an intense radiation source drives the reaction to form the particles. For convenience, this application refers to radiation-based pyrolysis and laser pyrolysis interchangeably, since a suitable intense source of electromagnetic radiation can be used in place of a laser. Laser pyrolysis is useful in the formation of particles that are highly uniform in composition, crystallinity and size.

The use of nanoscale particles within the polymer/inorganic particle blends can impart improved and/or desired properties for some applications. In particular, for the formation of optical materials, nanoparticles can provide desirable optical performance due to desirable optical properties, such as generally decreased scattering. High-quality nanoparticles are desirable for the generation of homogeneously mixed nanoparticle-polymer blends with well-defined optical properties. Specifically, it is desirable to have particles in which the primary particles are not agglomerated such that the primary particles can be dispersed effectively to form the composite. High-quality nanoparticles to form nanocomposites can be produced on a commercial scale, as described in U.S. Pat. No. 5,958,348 to Bi et al., entitled "Efficient Production of Particles By Chemical Reaction," incorporated herein by reference, and as described further below.

Since a wide range of inorganic particles and polymers can be incorporated into the composites described herein, the composites are suitable for a wide range of applications. Specifically, the materials and structures described herein are suitable for applications including, for example, structural applications, electronics applications and optical applications. Optical applications are described herein in more detail, although all applications are contemplated for the improved structures involving the polymer-inorganic particle blends. One significant advantage from the use of polymer-inorganic particle blends is the ability to control physical properties such as photonic or electronic parameters over a wide range. For example, if the inorganic particles have a high index-of-refraction, a variety of optical devices or optical coatings can be formed over wide range and controllable values of index-of-refraction. High index-of-refraction materials are desirable to control light propagation. The index-of-refraction of the composite can be controlled by adjusting particle loading.

The ability to control index-of-refraction has been demonstrated through the study of the photonic/optical properties of nanoparticle-polymer composites. For example, the refractive index, which determines the propagation of light within a material or device structure, can be studied as a function of parameters of the blend. Optical observations from polymer-inorganic nanoparticle composites are presented in the examples below. In particular, structural and optical properties of individual nano-$TiO_2$ particles are also described to show correlations between properties of nanoparticles and subsequent nanocomposites. The optical measurements with nano-$TiO_2$-based polymer composites confirm the ability to obtain high refractive index polymer-inorganic particle blends.

Controlled management of the refractive index (n) is important for photonic device applications. Index engineering as described herein includes formation of materials with desired refractive indices and their contrast with indices of adjacent materials at interfaces in an optical structure. Modulation of the refractive index by external fields may be achieved also.

Generally, the polymer-inorganic particle blends provide both for considerable versatility with respect to composition and corresponding properties as well as processing versatility for the formation of structures ranging from the straightforward to the complex. For optical applications, index-of-refraction can be selected through the corresponding selection of components of the blend and the particle loading. Conventional silica glass exhibits n~1.45, depending on the dopant and the level of doping. At the other end of the range, compound semiconductors such as InP have n~3.4. There is a large gap in between the two regions, which has not been covered adequately by existing materials systems. Even if the gap is covered by multiple materials, there is a significant challenge to form a workable interface between them. In contrast, polymer-inorganic particle blends formed with inorganic particles, such as nanoparticles, and a polymer matrix provide the ability to select a particular desired value of index-of-refraction. It has been found that once the high-index particles, in particular nanoparticles, and a polymer host material are chosen, the loading level of the nanoparticles directly determines the index of the entire composite.

By combining a plurality of materials of which one or more is a polymer-inorganic particle blend, interfaces can be formed between materials within structures such that the overall properties and/or functionality have desired features. For optical applications, the optical interface can involve optical materials with a selected difference in indices-of-refraction between the different materials. The polymer-inorganic particle blends can be used to engineer the index-of-refraction, which can be used to reduce the size of optical components. In particular, high index contrast at optical interfaces can be used to reduce device size, i.e., miniaturization.

In addition, the polymer-inorganic particle blends can be formed into heterostructures designed for particular applications. For some optical applications, the polymer-inorganic particle blends can be formed into periodic structures. The formation of periodic structures can be particularly advantageous in optical structures for the formation of, for example, structures with periodically modulated index-of-refraction. Optical materials with period variation in index-of-refraction can be used to form gratings or photonic crystals. The periodicity can extend in one, two or three dimensions.

Using polymer-inorganic particle blends, high index blends can be formed in association with low index materials, such as polymers with no particle loadings. With these associated materials, interfaces can be formed with large changes in index-of-refraction between the two materials at the interface. This large change in index-of-refraction can be used advantageously for the reflection of light and/or the confinement of light within a material. In particular, these large index changes can be used advantageously in the formation of displays and other optical devices.

In particular, the use of polymer/inorganic particle composites is particularly appropriate for the formation of devices with a selected dielectric constant/index-of-refraction. Through index-of-refraction engineering, the materials can be designed specifically for a particular application through corresponding selection of the index-of-refraction. Appropriate selection of index-of-refraction can be important for the preparation of either electrical or optical materials. The index-of-refraction is approximately the square root of the dielectric constant when there is no optical loss, so that the engineering of the index-of-refraction corresponds to the engineering of the dielectric constant. Thus, the index-of-refraction/dielectric constant is related to both the optical and electrical response of a particular material. Index-of-refraction engineering can be especially advantageous in the design of optical or electrical interconnects. The processing approaches described herein, including for example the self-assembly approaches, can be used to control domain size of materials forming devices and/or periodicity of the material compositions/index-of-refraction. Structure diameters and periodicities can be obtained on a submicron scale. Desirable size and/or periodicity length scales generally depend on the wavelengths of light. In addition, small size/periodicity scales can be used if index-of-refraction values change by larger amounts at interfaces. The use of nanoparticles and/or the ability to form submicron scale structures provides the ability to form quantum effect devices.

The polymer-inorganic particle blends can be processed using many standard polymer-processing approaches. Particularly suitable approaches generally depend on the specific structure being formed. However, in the formation of interfaces between the polymer-inorganic particle blends and other materials, certain approaches can be particularly suitable. For example, uniform layers can be applied by spin coating a solvated blend onto a substrate, such as a silicon wafer. The layers can be stacked by spin coating the materials sequentially. The solvents can be selected such that solvent used during the application of one layer does not dissolve a previously applied layer. In addition, extrusion of a solvated blend or a melt can be used to form interfaces. The multiple layers may or may not be coextruded. Calendering can be used to improve the qualities of the interface. Other molding and coating approaches can also be used. In general, the processing of the polymer-inorganic particle blends may or may not involve a substrate.

In addition, polymer-inorganic particle blends can be processed using self-assembly techniques to form periodic structures. In particular, for some optical applications, self-assembly techniques can be used to form periodic optical structures with periodic interfaces between two materials with a difference in value of index-of-refraction between the two materials. Generally, the periodic structure includes a polymer-inorganic particle blend as one or both of the periodically varying materials in the periodic structure in one dimension, two dimensions or three dimensions. The two dimensional variation in index-of-refraction can be used to construct two-dimensional photonic crystals. Similarly, a three dimensional variation in index-of-refraction can be used to construct three-dimensional photonic crystals. Three-dimensional photonic crystals may be used to form an ideal solid state laser without natural emission due to a photonic band gap. On the other hand, two-dimensional photonic crystals may lead to integration of surface emitting devices and waveguides to form wavelength-division-multiplexers.

The polymer-inorganic particle blends can be advantageously incorporated into a variety of devices, especially optical devices. Relevant devices include, for example, optical attenuator, optical splitter/coupler, optical switch, modulator, interconnect, optical isolator, optical add-drop multiplexer (OADM), optical amplifier, optical polarizer, optical circulator, phase shifter, optical mirror/reflector, optical phase-retarder, optical detector, displays, micro-electromechanical structures (MEMS), tunable filters, optical switches, Bragg gratings, mirrors, band pass filters, arrayed waveguide gratings (AWG), lasers, photonic crystals and quasicrystals. The devices can be placed within optical fibers or on planar optical structures. In particular, within planar optical structures, the devices can be part of a planar optical circuit with integrated optical devices.

Polymer-Inorganic Particle Blends

The particle-inorganic particle blends involve inorganic particles distributed throughout a polymer matrix such that the resulting blend incorporates aspects of both the inorganic particles and the polymer. The inorganic particles may or may not be chemically bonded to the polymer. The bonding of the inorganic particle to the polymer can involve a linker that is used to activate the surface of the inorganic particles for bonding with the polymer. Suitable blends can involve either low particle loadings or high particle loadings depending on the particular application. Similarly, the composition of the polymer component and the inorganic particle components can be selected to achieve desired properties of the resulting blend. The blends, especially polymer-inorganic particle composites, may represent a synergistic effect of the combined component.

The inorganic particles can be incorporated at a range of loadings into the composite. Composites with low particle loadings can be produced with high uniformity. Low loadings, such as one or two percent or less, can be desirable for some applications. In addition, high inorganic particle loadings can be achieved with well-dispersed particles. In addition, high inorganic particle loadings of up to about 80 weight percent or greater can be achieved with well dispersed particles. In general, the inorganic particle loadings are from about 0.1 weight percent to about 90 weight percent, in other embodiments from about 1 weight percent to about 85 weight percent, in further embodiments from about 3 weight percent to about 80 weight percent, in additional embodiments from about 5 weight percent to about 65 weight percent and in some embodiments from about 10 to about 50 weight percent. A person of skill in the art will recognize that other ranges within these explicit ranges are contemplated and are within the present disclosure. In addition, the amount the linker compounds bonded to the inorganic particles can be adjusted to vary the degree of crosslinking obtained with the polymer.

As noted above, the polymer-inorganic particle blends can involve chemical bonding between the inorganic particles and the polymers. For convenience, blends having chemical bonding between at least a portion of the inorganic particles and the polymer are called polymer-inorganic particle composites. Chemical bonding is considered to broadly cover bonding with some covalent character with or without partial ionic bonding character and can have properties of ligand-metal bonding. In other embodiments, the inorganic particles are simply embedded within the polymer matrix by the physical properties of the matrix. For convenience, blends not involving chemical bonding between the inorganic particles and the polymer matrix are called polymer-inorganic particle mixtures. Of course, polymer-inorganic particle mixtures generally involve non-bonding electrostatic interactions, such as van der Waals interactions, between the polymer and the inorganic particles.

While mixtures are suitable in many contexts, the formation of polymer-inorganic particle composites can have advantages with respect to stability and uniformity of the blend. Specifically, high particle loadings can be achieved in a composite without agglomeration of the particles, provided that the particles are functionalized with groups that do not easily bond to themselves, which can result in the formation of hard agglomerates. In addition, in relevant embodiments, the amount the linker compounds bonded to the inorganic particles can be adjusted to vary the degree of crosslinking obtained with the polymer.

The composites with bonding between the polymer and the particles comprise a monomer/polymer component, inorganic particles, and linker compounds that bridge the inorganic particles and the monomer/polymer. In the case of monomer units being joined to the linker compound, a polymer is formed with the formation of the composite. For simplicity in notation, the monomer/polymer unit joined with the linker and assembled into the composite will be referred to generally as a polymer, although it is recognized that in some cases the unit can be a monomer or polymer, such as a dimer, trimer or larger polymer structures.

The linker compounds have two or more functional groups. One functional group of the linker is suitable for chemical bonding to the inorganic particles. Chemical bonding is considered to broadly cover bonding with some covalent character with or without polar bonding and can have properties of ligand-metal bonding along with various degrees of ionic bonding. The functional group is selected based on the composition of the inorganic particle. Another functional group of the linker is suitable for covalent bonding with the polymer. Covalent bonding refers broadly to covalent bonds with sigma bonds, pi bonds, other delocalized covalent bonds and/or other covalent bonding types, and may be polarized bonds with or without ionic bonding components and the like. Convenient linkers include functionalized organic molecules.

Various structures can be formed based on the fundamental idea of forming the chemically bonded polymer/inorganic particle composites. The structures obtained will generally depend on the relative amounts of polymer/monomers, linkers and inorganic particles as well as the synthesis process itself. Linkers may be identified also as coupling agents or crosslinkers. Furthermore, in some embodiments, polymer-inorganic particle composites, as well as polymer-inorganic particle blends, can comprise a plurality of different polymers and/or a plurality of different inorganic particles. Similarly, if a poly-inorganic particle blend comprises a plurality of different polymer and/or a plurality of different inorganic particles, all of the polymer and/or inorganic particles can be chemically bondinged within the composite or, alternatively, only a fraction of the polymers and inorganic particles can be chemically bonded within the composite. If only a fraction of the polymer and/or inorganic particles are chemically bonded, the fraction bonded can be a random portion or a specific fraction of the total polymer and/or inorganic particles.

To form the desired composites, the inorganic particles can be modified on their surface by chemical bonding to one or more linker molecules. The ratio of linker composition to inorganic particles can be at least one linker molecule per inorganic particle. The linker molecules surface modify the inorganic particles, i.e., functionalize the inorganic particles. While the linker molecules can bond to the inorganic particles, they can be, but are not necessarily, bonded to the inorganic particles prior to bonding to the polymers. They can be bonded first to the polymers and only then bonded to the particles. Alternatively, they can bond to the two species simultaneously.

In some embodiments, the linker is applied to form at least a significant fraction of a monolayer on the surface of the particles. In particular, for example, at least about 20% of a monolayer can be applied to the particles, and in other embodiments, at least about 40% of a monolayer can be applied. Based on the measured BET surface areas of the particles, a quantity of linker can be used corresponding up to coverage about ½, 1 and 2 of the particle surface relative to a monolayer of the linker. A person of ordinary skill in the art will recognize that other ranges within these explicit ranges are contemplated and are within the present disclosure. A monolayer is calculated based on measured surface area of the particles and an estimate of the molecular radius of the linker based on accepted values of the atomic radii. Excess linker reagent can be added because not all of the linker binds and some self-polymerization of the linker reagent can take place. To calculate the coverage, the linker can be assumed to bond to the particle normal to the surface. This calculation provides an estimate of the coverage. It has been found experimentally that higher coverage could be placed over the surface of the particles than estimated from these calculations. With these high linker coverages, the linkers presumably form a highly crosslinked structure with the polymers. At each inorganic particle, multi-branched crosslinking structures are formed.

The inorganic particles can be bonded through the linker compound into the polymer structure, or the particles can be grafted to polymer side groups. The bonded inorganic particles can, in most embodiments, crosslink the polymer. Specifically, most embodiments involve star crosslinking of a single inorganic particle with several polymer groups. The structure of the composite can generally be controlled by the density of linkers, the length of the linkers, the chemical reactivity of the coupling reaction, the density of the reactive groups on the polymer as well as the loading of particles and the molecular weight range of the polymer (i.e., monomer/polymer units). In alternative embodiments, the polymer has functional groups that bond directly with the inorganic particles, either at terminal sites or at side groups. In these alternative embodiments, the polymer includes functional groups comparable to appropriate linker functional groups for bonding to the inorganic particles.

A range of polymers is suitable for incorporation into the composites, including, without limitation, organic polymers, inorganic polymers, such as polysiloxanes, and combinations and copolymers thereof. If the polymers are formed prior to reacting with the functionalized inorganic particles, the molecular weights of the polymers can be selected to vary to properties of the resulting composite. The polymer is selected or synthesized to include appropriate functional groups to covalently bond with functional groups of the linker compound.

The frame of the linker supporting the functional groups is generally an organic compound, although it may also include silyl and/or siloxy moieties. The organic linker frame can comprise any reasonable organic moiety including, for example, linear or branched carbon chains, cyclical carbon moieties, saturated carbon moieties, unsaturated carbon moieties, aromatic carbon units, halogenated carbon groups and combinations thereof. The structure of the linker can be selected to yield desirable properties of the composite. For example, the size of the linker is a control parameter that may affect the periodicity of the composite and the self-organization properties.

Many different types of polymers are suitable as long as they have terminal groups and/or preferably side groups capable of bonding to a linker. Suitable organic polymers include, for example, polyamides (nylons), polyimides, polycarbonates, polyurethanes, polyacrylonitrile, polyacrylic acid, polyacrylates, polyacrylamides, polyvinyl alcohol, polyvinyl chloride, heterocyclic polymers, polyesters, modified polyolefins and copolymers and mixtures thereof. Composites formed with nylon polymers, i.e., polyamides, and inorganic nanoparticles can be called Nanonylon™. Suitable polymers include conjugated polymers within the polymer backbone, such as polyacetylene, and aromatic polymers within the polymer backbone, such as polyp-phenylene), poly(phenylene vinylene), polyaniline, polythiophene, poly(phenylene sulfide), polypyrrole and copolymers and derivatives thereof. Some polymers can be bonded to linkers at functional side groups. The polymer can inherently include desired functional groups, can be chemically modified to introduce desired functional groups or copolymerized with monomer units to introduce portions of desired functional groups. Similarly, some composites include only a single polymer/monomer composition bonded into the composite. Within a crosslinked structure, a polymer is identifiable by 3 or more repeat units along a chain, except for hydrocarbon chains which are not considered polymers unless they have a repeating side group or at least about 50 carbons—carbon bonds within the chain.

Preferred silicon-based polymers include polysilanes, polysiloxane (silicone) polymers, such as poly(dimethylsiloxane) (PDMS) and copolymers and mixtures thereof as well as copolymers and mixtures with organic polymers. Polysiloxanes are particularly suitable for forming composites with grafted inorganic particles. To form these grafted composites, the polysiloxanes can be modified with amino and/or carboxylic acid groups. Polysiloxanes are desirable polymers because of their transparency to visible and ultraviolet light, high thermal stability, resistance to oxidative degradation and its hydrophobicity. Other inorganic polymers include, for example, phosphazene polymers (phosphonitrile polymers).

Appropriate functional groups for binding with the polymer depend on the functionality of the polymer. Generally, the functional groups of the polymers and the linker can be selected appropriately based on known bonding properties. For example, carboxylic acid groups bond covalently to thiols, amines (primary amines and secondary amines) and alcohol groups. As a particular example, nylons can include unreacted carboxylic acid groups, amine groups or derivatives thereof that are suitable form covalently bonding to linkers. In addition, for bonding to acrylic polymers, a portion of the polymer can be formed from acrylic acid or derivatives thereof such that the carboxylic acid of the acrylic acid can bond with amines (primary amines and secondary amines), alcohols or thiols of a linker. The functional groups of the linker can provide selective linkage either to only particles with particular compositions and/or polymers with particular functional groups. Other suitable functional groups for the linker include, for example, halogens, silyl groups ($—SiR_{3-x}H_x$), isocyanate, cyanate, thiocyanate, epoxy, vinyl silyls, silyl hydrides, silyl halogens, mono-, di- and trihaloorganosilane, phosphonates, organometallic carboxylates, vinyl groups, allyl groups and generally any unsaturated carbon groups (—R'—C=C—R"), where R' and R" are any groups that bond within this structure. Selective linkage can be useful in forming composite structures that exhibit self-organization.

Upon reaction of the polymer functional groups with the linker functional groups, the identity of initial functional groups is merged into a resultant or product functional group in the bonded structure. A linkage is formed that extends from the polymer. The linkage extending from the polymer can include, for example, an organic moiety, a siloxy moiety, a sulfide moiety, a sulphonate moiety, a phosphonate moiety, an amine moiety, a carbonyl moiety, a hydroxyl moiety, or a combination thereof. The identity of the original functional groups may or may not be apparent depending on the resulting functional group. The resulting functional groups generally can be, for example, an ester group, an amide group, an acid anhydride group, an ether group, a sulfide group, a disulfide group, an alkoxy group, a hydrocarbyl group, a urethane group, an amine group, an organo silane group, a hydridosilane group, a silane group, an oxysilane group, a phosphonate group, a sulphonate group or a combination thereof.

If a linker compound is used, one resulting functional group generally is formed where the polymer bonds to the linker and a second resulting functional group is formed where the linker bonds to the inorganic particle. At the inorganic particle, the identification of the functional group may depend on whether particular atoms are associated with the particle or with the functional group. This is just a nomenclature issue, and a person of skill in the art can identify the resulting structures without concern about the particular allocation of atoms to the functional group. For example, the bonding of a carboxylic acid with an inorganic particle may result in a group involving bonding with a non-metal/metalloid atom of the particle; however, an oxo group is generally present in the resulting functional group regardless of the composition of the particle. Ultimately, a bond extends to a metal/metalloid atom.

Appropriate functional groups for bonding to the inorganic particles depends on the character of the inorganic particles. U.S. Pat. No. 5,494,949 to Kinkel et al., entitled "SURFACE-MODIFIED OXIDE PARTICLES AND THEIR USE AS FILLERS AND MODIFYING AGENTS IN POLYMER MATERIALS," incorporated herein by reference, describes the use of silylating agents for bonding to metal/metalloid oxide particles. The particles have alkoxy modified silane for bonding to the particles. For example, preferred linkers for bonding to metal/metalloid oxide particles include $R^1R^2R^3$—Si—$R^4$, where $R^1$, $R^2$, $R^3$ are alkoxy groups, which can hydrolyze and bond with the particles, and $R^4$ is a group suitable for bonding to the polymer. Trichlorosilicate (—$SiCl_3$) functional groups can react with an hydroxyl group at the metal oxide particle surface by way of a condensation reaction.

Generally, thiol groups can be used to bind to metal sulfide particles and certain metal particles, such as gold, silver, cadmium and zinc. Carboxyl groups can bind to other metal particles, such as aluminum, titanium, zirconium, lanthanum and actinium. Similarly, amines and hydroxide groups would be expected to bind with metal oxide particles and metal nitride particles, as well as to transition metal atoms, such as iron, cobalt, palladium and platinum.

The identity of the linker functional group that bonds with the inorganic particle may also be modified due to the character of the bonding with the inorganic particle. One or more atoms of the inorganic particle are involved in forming the bond between the linker and the inorganic particle. It may be ambiguous if an atom in the resulting linkage originates from the linker compound or the inorganic particle. In any case, a resulting or product functional group is formed joining the linker molecule and the inorganic particle. The resulting functional group can be, for example, one of the functional groups described above resulting from the bonding of the linker to the polymer. The functional group at the inorganic particle ultimately bonds to one or more metal/metalloid atoms.

In some embodiments, the polymer incorporates the inorganic particles into the polymer network. This can be performed by reacting a functional group of the linker compound with terminal groups of a polymer molecule. Alternatively, the inorganic particles can be present during the polymerization process such that the functionalized inorganic particles are directly incorporated into the polymer structure as it is formed. In other embodiments, the inorganic particles are grafted onto the polymer by reacting the linker functional groups with functional groups on polymer side groups. In any of these embodiments, the surface modified/functionalized inorganic particles can crosslink the polymer if there are sufficient linker molecules, i.e., enough to overcome energetic barriers and form at least two or more bonded links to the polymer. Generally, an inorganic particle will have many linkers associated with the particle. Thus, in practice, the crosslinking depends on the polymer-particle arrangement, statistical interaction of two crosslinking groups combined with molecular dynamics and chemical kinetics.

In some embodiments, the composite is formed into localized structures by self-assembly. The composition and/or structure of the composite can be selected to encourage self-organization of the composite itself. For example, block copolymers can be used such that the different blocks of the polymer segregate, which is a standard property of many block copolymers. Suitable block copolymers include, for example, polystyrene-block-poly(methyl methacrylate), polystyrene-block-polyacrylamide, polysiloxane-block-polyacrylate and mixtures thereof. These block copolymers can be modified to include appropriate functional groups to bond with the linkers. For example, polyacrylates can be hydrolyzed or partly hydrolyzed to form carboxylic acid groups, or acrylic acid moieties can be substituted for all or part of the acrylated during polymer formation if the acid groups do not interfere with the polymerization. Alternatively, the ester groups in the acrylates can be substituted with ester bonds to diols or amide bonds with diamines such that one of the functional groups remains for bonding with a linker. Block copolymers with other numbers of blocks and other types of polymer compositions can be used.

The inorganic particles can be associated with only one of the polymer compositions within the block such that the inorganic particles are segregated together with that polymer composition within the segregation block copolymer. For example, an AB di-block copolymer can include inorganic particles only within block A. Segregation of the inorganic particles can have functional advantages with respect to taking advantage of the properties of the inorganic particles. Similarly, tethered inorganic particles may separate relative to the polymer by analogy to different blocks of a block copolymer if the inorganic particles and the corresponding polymers have different solvation properties. In addition, the nanoparticles themselves can segregate relative to the polymer to form a self-organized structure.

Other ordered copolymers include, for example, graft copolymers, comb copolymers, star-block copolymers, dendrimers, mixtures thereof and the like. Ordered copolymers of all types can be considered a polymer blend in which the polymer constituents are chemically bonded to each other. Physical polymer blends may also be used and may also exhibit self-organization, as described in the examples below. Polymer blends involve mixtures of chemically distinct polymers. The inorganic particles may bond to only a subset of the polymer species, as described above for block copolymers. Physical polymer blends can exhibit self-organization similar to block copolymers. The presence of the inorganic particles can sufficiently modify the properties of the composite that the interaction of the polymer with inorganic particles interacts physically with the other polymer species differently than the native polymer alone. In particular, the presence of nanoparticles within the polymer-inorganic particle blends can result in a blend that is sensitive to weak fields due to the small particle size. This sensitivity can be advantageously used in the formation of devices. Processes making use of small particles generally can be referred to as a soft matter approach.

Regardless of the self-organization mechanism, some self-organized composites involve nanoparticles aligned with periodicity in a superstructure or super crystal structure, i.e., a periodic array of crystalline particles. The particles may or may not be crystalline themselves yet they will exhibit properties due to the ordered structure of the particles. Photonic crystals make use of these crystal superstructures, as described further below.

Exemplary embodiments of polymer-inorganic particle composites are described further in commonly assigned U.S. patent application Ser. No. 09/818,141, now U.S. Pat. No. 6,599,631 to Kambe et al., entitled "Polymer-Inorganic Particle Composites," incorporated herein by reference.

Inorganic Particles

In general, any reasonable inorganic particles can be used to form the blends. In some embodiments, the particles have an average diameter of no more than about one micron. For some applications of interest, the composition of the particles is selected to impart desired properties to the composite. Thus, in the formation of optical materials for example, the optical properties of both the polymer and the inorganic particles can be significant. It is expected that the index-of-refraction of the composite material is roughly the linear combination based on the weight ratios of the index-of-refractions of the inorganic particles and the polymer to quite high particle loadings by weight.

Suitable nanoparticles can be formed, for example, by laser pyrolysis, flame synthesis, combustion, or sol gel approaches. In particular, laser pyrolysis is useful in the formation of particles that are highly uniform in composition, crystallinity and size. Laser pyrolysis involves light from an intense light source that drives the reaction to form the particles. Laser pyrolysis is an excellent approach for efficiently producing a wide range of nanoscale particles with a selected composition and a narrow distribution of average particle diameters. Alternatively, submicron particles can be produced using a flame production apparatus such as the apparatus described in U.S. Pat. No. 5,447,708 to Helble et al., entitled "Apparatus for Producing Nanoscale Ceramic Particles," incorporated herein by reference. Furthermore, submicron particles can be produced with a thermal reaction chamber such as the apparatus described in U.S. Pat. No. 4,842,832 to Inoue et al., "Ultrafine Spherical Particles of Metal Oxide and a Method for the Production Thereof," incorporated herein by reference. In addition, various solution-based approaches can be used to produce submicron particles, such as sol gel techniques.

Highly uniform particles can be formed by radiation based pyrolysis, e.g., laser pyrolysis, which can be used to form submicron particles with extremely uniform properties with a variety of selectable compositions. For convenience, radiation based pyrolysis is referred to as laser pyrolysis since this terminology reflects the convenience of lasers as a radiation source. Laser pyrolysis approaches discussed herein incorporate a reactant flow that can involve vapors, aerosols or combinations thereof to introduce desired elements into the flow stream. The versatility of generating a reactant stream with vapor and/or aerosol precursors provides for the generation of particles with a wide range of potential compositions.

Small particles can provide processing advantages with respect to forming small structures and smooth surfaces. In addition, small particles have desirable properties for optical applications including, for example, a shifted absorption spectrum and reduced scattering, which results in lower scattering loss. Thus, small particle exhibit observable quantum effects due to their small size, which can affect the optical properties of corresponding polymer-inorganic particle blends.

A collection of submicron/nanoscale particles may have an average diameter for the primary particles of less than about 500 nm, preferably from about 2 nm to about 100 nm, alternatively from about 2 nm to about 75 nm, or from about 2 nm to about 50 nm. A person of ordinary skill in the art will recognize that other ranges within these specific ranges are covered by the disclosure herein. Particle diameters are evaluated by transmission electron microscopy.

The primary particles can have a roughly spherical gross appearance, or they can have rod shapes, plate shapes or other non-spherical shapes. Upon closer examination, crystalline particles generally have facets corresponding to the underlying crystal lattice. Amorphous particles generally have a spherical aspect. Diameter measurements on particles with asymmetries are based on an average of length measurements along the principle axes of the particle.

Because of their small size, the primary particles tend to form loose agglomerates due to van der Waals and other electromagnetic forces between nearby particles. These agglomerates can be dispersed in a dispersant to a significant degree based on the primary particles, and in some embodiments essentially completely to form dispersed primary particles. The size of the dispersed particles can be referred to as the secondary particle size. The primary particle size, of course, is the lower limit of the secondary particle size for a particular collection of particles, so that the average secondary particle size preferably is approximately the average primary particle size. The secondary or agglomerated particle size may depend on the subsequent processing of the particles following their initial formation and the composition and structure of the particles. In some embodiments, the secondary particles have an average diameter no more than about 1000 nm, in additional embodiments no more than about 500 nm, in further embodiments from about 2 nm to about 300 nm, in other embodiments about 2 nm to about 100 nm, and alternatively about 2 nm to about 50 nm. A person of ordinary skill in the art will recognize that other ranges within these specific ranges are contemplated and are within the present disclosure. Secondary particles sizes within a liquid dispersion can be measured by established approaches, such as dynamic light scattering. Suitable particle size analyzers include, for example, a Microtrac UPA instrument from Honeywell based on dynamic light scattering, a Horiba Particle Size Analyzer from Horiba, Japan and ZetaSizer Series of instruments from Malvern based on Photon Correlation Spectroscopy. The principles of dynamic light scattering for particle size measurements in liquids are well established.

Even though the particles form loose agglomerates, the nanometer scale of the primary particles is clearly observable in transmission electron micrographs of the particles. The particles generally have a surface area corresponding to particles on a nanometer scale as observed in the micrographs. Furthermore, the particles can manifest unique properties due to their small size and large surface area per weight of material. For example, the absorption spectrum of crystalline, nanoscale $TiO_2$ particles is shifted, as described in the examples below.

The primary particles can have a high degree of uniformity in size. Laser pyrolysis generally results in particles having a very narrow range of particle diameters. Furthermore, heat processing under suitably mild conditions does not alter the very narrow range of particle diameters. With aerosol delivery of reactants for laser pyrolysis, the distribution of particle diameters is particularly sensitive to the reaction conditions. Nevertheless, if the reaction conditions are properly controlled, a very narrow distribution of particle diameters can be obtained with an aerosol delivery system. As determined from examination of transmission electron micrographs, the primary particles generally have a distribution in sizes such that at least about 95 percent, and preferably 99 percent, of the primary particles have a diameter greater than about 40 percent of the average diameter and less than about 160 percent of the average diameter. Preferably, the primary particles have a distribution of diameters such that at least about 95 percent, and preferably 99 percent, of the primary particles have a diameter greater than about 60 percent of the average diameter and less than about 140 percent of the average diameter. A person of ordinary skill in the art will recognize that other ranges within these specific ranges are covered by the disclosure herein.

Furthermore, in preferred embodiments no primary particles have an average diameter greater than about 4 times the average diameter and preferably 3 times the average diameter, and more preferably 2 times the average diameter. In other words, the particle size distribution effectively does not have a tail indicative of a small number of particles with significantly larger sizes. This is a result of the small reaction region and corresponding rapid quench of the particles. An effective cut off in the tail of the size distribution indicates that there are less than about 1 particle in $10^6$ have a diameter greater than a specified cut off value above the average diameter. High particle uniformity can be exploited in a variety of applications. In particular, high particle uniformity can lead to well controlled optical properties.

In addition, the nanoparticles for incorporation into the blends may have a very high purity level. Furthermore, crystalline nanoparticles, such as those produced by laser pyrolysis, can have a high degree of crystallinity. Similarly, the crystalline nanoparticles produced by laser pyrolysis can be subsequently heat processed to improve and/or modify the degree of crystallinity and/or the particular crystal structure. Impurities on the surface of the particles may be removed by heating the particles to achieve not only high crystalline purity but high purity overall.

A basic feature of successful application of laser pyrolysis for the production of desirable inorganic nanoparticles is the generation of a reactant stream containing one or more metal/metalloid precursor compounds, a radiation absorber and, in some embodiments, a secondary reactant. The secondary reactant can be a source of non-metal/metalloid atoms, such as oxygen, required for the desired product and/or can be an oxidizing or reducing agent to drive a desired product formation. A secondary reactant is not needed if the precursor decomposes to the desired product under intense light radiation. Similarly, a separate radiation absorber is not needed if the metal/metalloid precursor and/or the secondary reactant absorb the appropriate light radiation. The reaction of the reactant stream is driven by an intense radiation beam, such as a light beam, e.g., a laser beam. As the reactant stream leaves the radiation beam, the particles are rapidly quenched.

A laser pyrolysis apparatus suitable for the production of commercial quantities of particles by laser pyrolysis has been developed using a reactant inlet that is significantly elongated in a direction along the path of the laser beam. This high capacity laser pyrolysis apparatus, e.g., 1 kilogram or more per hour, is described in U.S. Pat. No. 5,958,348, entitled "Efficient Production Of Particles By Chemical Reaction," incorporated herein by reference. Approaches for the delivery of aerosol precursors for commercial production of particles by laser pyrolysis is described in commonly assigned U.S. Pat. No. 6,193,936 to Gardner et al., entitled "Reactant Delivery Apparatus," incorporated herein by reference.

In general, nanoparticles produced by laser pyrolysis can be subjected to additional processing to alter the nature of the particles, such as the composition and/or the crystallinity. For example, the nanoparticles can be subjected to heat processing in a gas atmosphere prior to use. Under suitably mild conditions, heat processing is effective to modify the characteristics of the particles without destroying the nanoscale size or the narrow particle size distribution of the initial particles. For example, heat processing of submicron vanadium oxide particles is described in U.S. Pat. No. 5,989,514 to Bi et al., entitled "Processing Of Vanadium Oxide Particles With Heat," incorporated herein by reference.

A wide range of simple and complex submicron and/or nanoscale particles have been produced by laser pyrolysis with or without additional heat processing. In embodiments of particular interest for the formation of polymer-inorganic particle blends, the inorganic particles generally include metal or metalloid elements in their elemental form or in compounds. Specifically, the inorganic particles can include, for example, elemental metal or elemental metalloid, i.e. un-ionized elements such as silver and silicon, metal/metalloid oxides, metal/metalloid nitrides, metal/metalloid carbides, metal/metalloid sulfides or combinations thereof. In addition, there is the capability for producing nano-particulate carbon materials. Complex systems of ternary and quaternary compounds have also been made. In addition, uniformity of these high quality materials is substantial. These particles generally have a very narrow particle size distribution, as described above. Availability of multiple types of nanoparticles provides a significant increase in potential combinations between nanoparticles and polymers.

With respect to the electrical properties of the particles, some particles include compositions such that the particles are electrical conducting, electrical insulators or electrical semiconductors. Suitable electrical conductors include, for example, elemental metals and some metal compositions. Electrical conductors, such as metals, generally have a room temperature resistivity of no more than about $1 \times 10^{-3}$ Ohm-cm. Electrical insulators generally have a room temperature resistivity of at least about $1 \times 10^5$ Ohm-cm. Electrical semiconductors include, for example, silicon, CdS and InP. Semiconducting crystals can be classified to include so called, II-VI compounds, III-V compounds and group IV compounds, where the number refers to the group in the periodic table. Semiconductors are characterized by a large increase in conductivity with temperature in pure form and an increase in electrical conductivity by orders of magnitude upon doping with electrically active impurities. Semiconductors generally have a band gap that results in the observed conductivity behavior. At room temperature, the conductivity of a semiconductor is generally between that of a metal and a good electrical insulator.

Several different types of nanoscale particles have been produced by laser pyrolysis. As used herein, inorganic particles include carbon particles as carbonaceous solids, such as fullerenes, graphite, and carbon black. Such nanoscale particles for light reactive deposition can generally be characterized as comprising a composition with a number of different elements that are present in varying relative proportions, where the number and the relative proportions are selected based on the application for the nanoscale particles. Materials that have been produced (possibly with additional processing, such as a heat treatment) or have been described in detail for production by laser pyrolysis include, for example, carbon particles, silicon, amorphous $SiO_2$, doped $SiO_2$, crystalline silicon dioxide, titanium oxide (anatase and rutile $TiO_2$), MnO, $Mn_2O_3$, $Mn_3O_4$, $Mn_5O_8$, vanadium oxide, silver vanadium oxide, lithium manganese oxide, aluminum oxide ($\gamma$-$Al_2O_3$, delta-$Al_2O_3$ and theta-$Al_2O_3$), doped-crystalline and amorphous alumina, tin oxide, zinc oxide, rare earth metal oxide particles, rare earth doped metal/metalloid oxide particles, rare earth metal/metalloid sulfides, rare earth doped metal/metalloid sulfides, silver metal, iron, iron oxide, iron carbide, iron sulfide ($Fe_{1-x}S$), cerium oxide, zirconium oxide, barium titanate ($BaTiO_3$), aluminum silicate, aluminum titanate, silicon carbide, silicon nitride, and metal/metalloid compounds with complex anions, for example, phosphates, silicates and sulfates. In particular, many materials suitable for the production of optical materials can be produced by laser pyrolysis. The production of particles by laser pyrolysis and corresponding deposition as a coating having ranges of compositions is described further in commonly assigned U.S. patent application Ser. No. 10/027,906, now U.S. Pat. No. 6,952,504 to Bi et al., entitled "Three Dimensional Engineering of Optical Structures," incorporated herein by reference.

Submicron and nanoscale particles can be produced with selected dopants using laser pyrolysis and other flowing reactor systems. Amorphous powders and crystalline powders can be formed with complex compositions comprising a plurality of selected dopants. The powders can be used to form optical materials and the like. Amorphous submicron and nanoscale powders and glass layers with dopants, such as rare earth dopants and/or other metal dopants, are described further in commonly assigned U.S. Provisional Patent Application Ser. No. 60/313,588 to Horne et al., entitled "Doped Glass Materials," incorporated herein by reference. Crystalline submicron and nanoscale particles with dopants, such as rare earth dopants, are described further in commonly assigned U.S. patent application Ser. No. 09/843,195, now U.S. Pat. No. 6,692,660 to Kumar et al., entitled "High Luminescence Phosphor Particles," incorporated herein by reference.

The dopants can be introduced at desired quantities by varying the composition of the reactant stream. The dopants are introduced into an appropriate host material by appropriately selecting the composition in the reactant stream and the processing conditions. Thus, submicron particles incorporating one or more metal or metalloid elements as host composition with selected dopants, including, for example, rare earth dopants and/or complex blends of dopant compositions, can be formed. For embodiments in which the host materials are oxides, an oxygen source should also be present in the reactant stream. For these embodiments, the conditions in the reactor should be sufficiently oxidizing to produce the oxide materials.

Furthermore, dopants can be introduced to vary properties of the resulting particles. For example, dopants can be introduced to change the index-of-refraction of the particles that are subsequently incorporated into the polymer-inorganic particle blend. For optical applications, the index-of-refraction can be varied to form specific optical devices that operate with light of a selected frequency range. Dopants can also be introduced to alter the processing properties of the material. Furthermore, dopants can also interact within the materials. For example, some dopants are introduced to increase the solubility of other dopants.

In some embodiments, the one or plurality of dopants are rare earth metals or rare earth metals with one or more other dopant elements. Rare earth metals comprise the transition metals of the group IIIb of the periodic table. Specifically, the rare earth elements comprise Sc, Y and the Lanthanide series. Other suitable dopants comprise elements of the actinide series. For optical glasses, the rare earth metals of particular interest as dopants comprise, for example, Ho, Eu, Ce, Tb, Dy, Er, Yb, Nd, La, Y, Pr and Tm. Generally, the rare earth ions of interest have a +3 ionization state, although $Eu^{+2}$ and $Ce^{+4}$ are also of interest. Rare earth dopants can influence the optical absorption properties that alter the application of the materials for the production of optical amplifiers and other optical devices. Suitable non-rare earth metal dopants for optical glasses comprise, for example, Bi, Sb, Zr, Pb, Li, Na, K, Ba, B, Ge, W, Ca, Cr, Ga, Al, Mg, Sr, Zn, Ti, Ta, Nb, Mo, Th, Cd and Sn.

In addition, suitable metal oxide dopants for aluminum oxide for optical glass formation comprise cesium oxide ($Cs_2O$), rubidium oxide ($Rb_2O$), thallium oxide ($Tl_2O$), lithium oxide ($Li_2O$), sodium oxide ($Na_2O$), potassium oxide ($K_2O$), beryllium oxide (BeO), magnesium oxide (MgO), calcium oxide (CaO), strontium oxide (SrO) and barium oxide (BaO). Aluminum oxide dopants can affect, for example, the index-of-refraction, consolidation temperature and/or the porosity of the glass. Suitable metal oxide dopants for infrared emitters comprise, for example, cobalt oxide ($Co_3O_4$), $Er_2O_3$, $CrO_2$, $Tm_2O_3$, $Nd_2O_3$, $Yb_2O_3$, $Pr_2O_3$, $Dy_2O_3$, and $Ho_2O_3$.

As noted above, laser pyrolysis has been used to produce a range of powder compositions. The compositions can include multiple metal/metalloid elements. A representative sample of references relating to some of these powder materials are presented.

As a first example of nanoparticle production, the production of silicon oxide nanoparticles is described in commonly assigned U.S. patent application Ser. No. 09/085,514, now U.S. Pat. No. 6,726,990 to Kumar et al., entitled "Silicon Oxide Particles," incorporated herein by reference. This patent application describes the production of amorphous $SiO_2$. The synthesis by laser pyrolysis of silicon carbide and silicon nitride is described in commonly assigned U.S. patent application Ser. No. 09/433,202 to Reitz et al. filed on Nov. 5, 1999, entitled "Particle Dispersions," incorporated herein by reference. The production of silicon particles by laser pyrolysis is described in an article by Cannon et al., J. of the American Ceramic Society, Vol. 65, No. 7, pp. 330-335 (1982), entitled Sinterable Ceramic Particles From Laser-Driven Reactions: II, Powder Characteristics And Process Variables," incorporated herein by reference.

The production of titanium oxide nanoparticles and crystalline silicon dioxide nanoparticles is described in commonly assigned, U.S. patent application Ser. No. 09/123,255, now U.S. Pat. No. 6,387,531 to Bi et al., entitled "Metal (Silicon) Oxide/Carbon Composites," incorporated herein by reference. In particular, this application describes the production of anatase and rutile $TiO_2$. The production of aluminum oxide nanoparticles is described in commonly assigned, U.S. patent application Ser. No. 09/136,483 to Kumar et al., entitled "Aluminum Oxide Particles," incorporated herein by reference. In particular, this application disclosed the production of γ-$Al_2O_3$. Suitable liquid, aluminum precursors with sufficient vapor pressure of gaseous delivery include, for example, aluminum s-butoxide ($Al(OC_4H_9)_3$). Also, a number of suitable solid, aluminum precursor compounds are available including, for example, aluminum chloride ($AlCl_3$), aluminum ethoxide ($Al(OC_2H_5)_3$), and aluminum isopropoxide ($Al[OCH(CH_3)_2]_3$).

Furthermore, mixed metal oxide nanoparticles have been produced by laser pyrolysis along with or without subsequent heat processing, as described in commonly assigned U.S. patent application Ser. No. 09/188,768, now U.S. Pat. No. 6,607,706 to Kumar et al., entitled "Composite Metal Oxide Particles," and Ser. No. 09/334,203, now U.S. Pat. No. 6,482,374 to Kumar et al., entitled "Reaction Methods for Producing Ternary Particles," and U.S. Pat. No. 6,136,287 to Horne et al., entitled "Lithium Manganese Oxides and Batteries," all three of which are incorporated herein by reference. The formation of submicron and nanoscale particles comprising metal/metalloid compounds with complex anions is described in commonly assigned U.S. patent application Ser.

No. 09/845,985 to Chaloner-Gill et al., entitled "Phosphate Powder Compositions And Methods For Forming Particles With Complex Anions," incorporated herein by reference. Suitable complex anions include, for example, phosphates, silicates and sulfates.

Formation of Polymer-Inorganic Particle Blends

Formation of the blends involves distributing the particles within the polymer material such that the resulting blend forms a single material. The polymerization process can be performed before combining the particles with the polymer materials or in the presence of the inorganic particles or some combination thereof. The process for forming a particular blend generally depends on whether the particles are simply dispersed within a polymer matrix binder as a mixture or whether at least some of the particles are covalently bonded to the polymer as a composite. The process for forming the blend may involve dispersing the inorganic particles, especially for the formation of composites. If a composite is formed a linker molecule may be used to join the polymer and the inorganic particle. The order for bonding the linker, the inorganic particles and the polymer can be selected to yield a convenient process.

The formation of a particle dispersion provides for the separation of the particles such that the particles can be well dispersed within the resulting blend. The use of a dispersion can result in a more uniform blend with the particles approximately uniformly distributed through the blend. The solvent, pH, ionic strength and additives can be selected to improve the dispersion of the particles. Greater dispersion of the particles and stability of the dispersions helps to reduce agglomeration of the particles in the resulting blend.

However, in alternative embodiments, the powders can be ground or otherwise directly mixed with the polymer to disperse the particles through the polymer. Mixing can be performed with or without the presence of a solvent/dispersant. Commercial mixers or grinders, for example, can be used to form the particle-polymer mixtures. Heat, pressure and/or solvent/dispersant removal can be used to bind particles within a polymer mixture in which the polymer functions as a binder. Although at high particle loadings in a mixture, the particles may be highly aggregated, unless possibly if the particles were well dispersed prior to and during formation of the mixture.

In some embodiments, the formation of a particle dispersion can be a distinct step of the process. Preferably, a collection of particles, e.g., nanoparticles, is well dispersed for uniform introduction into a polymer blend, e.g., a composite. A liquid phase particle dispersion can provide a source of small secondary particles that can be used in the formation of desirable blend structures. Desirable qualities of a liquid dispersion of inorganic particles generally depend on the concentration of particles, the composition of the dispersion and the formation of the dispersion. Specifically, the degree of dispersion intrinsically depends on the interparticle interactions, the interactions of the particles with the liquid and the surface chemistry of the particles. Suitable dispersants include, for example, water, organic solvents, such as alcohols and hydrocarbons, and combinations thereof. The selection of appropriate dispersants/solvents generally depends on the properties of the particles. The degree of dispersion and stability of the dispersion can be significant features for the production of uniform composites without large effects from significantly agglomerated particles.

Generally, the liquid dispersions refer to dispersions having particle concentrations of no more than about 80 weight percent. For the formation of a particle dispersion, the particular particle concentration depends on the selected application. At concentrations greater than about 50 weight percent, different factors can be significant with respect to the formation and characterization of the resulting viscous blend relative to parameters that characterize the more dilute particle dispersions. The concentration of particles affects the viscosity and can affect the efficacy of the dispersion process. In particular, high particle concentrations can increase the viscosity and make it more difficult to disperse the particles to achieve small secondary particle sizes, although the application of shear can assist with particle dispersion.

Since many polymers are soluble in organic solvents, many embodiments involve the formation of non-aqueous dispersions. In addition, water based dispersions can include additional compositions, such as surfactants, buffers and salts. For particular particles, the properties of the dispersion can be adjusted by varying the pH and/or the ionic strength. Ionic strength can be varied by addition of inert salts, such as sodium chloride, potassium chloride or the like. The presence of the linker can effect the properties and stability of the dispersion. The pH generally affects the surface charge of the dispersed particles. The liquid may apply physical/chemical forces in the form of solvation-type interactions to the particles that may assist in the dispersion of the particles. Solvation-type interactions can be energetic and/or entropic in nature.

The qualities of the dispersion generally depend on the process for the formation of the dispersion. In dispersions, besides chemical/physical forces applied by the dispersant and other compounds in the dispersion, mechanical forces can be used to separate the primary particles, which are held together by van der Waals forces and other short range electromagnetic forces between adjacent particles. In particular, the intensity and duration of mechanical forces applied to the dispersion significantly influences the properties of the dispersion. Mechanical forces can be applied to the powders prior to dispersion in a solvent. Alternatively, mechanical forces, such as shear stress, can be applied as mixing, agitation, jet stream collision and/or sonication following the combination of a powder or powders and a liquid or liquids. Smaller secondary particles sizes are obtained if there is more disruption of the agglomerating forces between the primary particles.

The presence of small secondary particle sizes, e.g., close to the primary particle size, can result in significant advantages in the application of the dispersions for the formation of blends with uniform properties. For example, smaller secondary particle sizes, and generally small primary particle sizes, may assist with the formation of smoother and/or smaller and more uniform structures using the blends. In the formation of coatings, thinner and smoother coatings can be formed with blends formed with inorganic particle dispersions having smaller secondary particles.

Once the dispersion is formed, the dispersion may eventually separate such that the particles collect on the bottom of the container without continued mechanical stirring or agitation. Stable dispersions have particles that do not separate out of the dispersion. Different dispersions have different degrees of stability. The stability of a dispersion depends on the properties of the particles, the other compositions in the dispersion, the processing used to form the dispersion and the presence of stabilizing agents. Suitable stabilizing agents include, for example, surfactants. In some embodiments, dispersions are reasonably stable, such that the dispersions can be used without significant separation during the subsequent processing steps forming the blends, although suitable processing to form a blend can be used involving constant mixing or the like to prevent separation of the particle dispersion.

For the formation of composites, during formation or after formation of the particle dispersion, the dispersion is interacted with the linker molecules and/or the polymer. To form the desired composites, the inorganic particles may be modified on their surface by chemical bonding to one or more linker molecules. Generally, for embodiments involving a linker, the linker is soluble in the liquid used to form the inorganic particle dispersion and/or the polymer dispersion so that the linker is substantially homogeneously dissolved when bonding from solution. Conditions for the combined particle dispersion and polymer dispersion/solution can be suitable for the formation of bonds between the linker, the inorganic particles and the polymer. The order for adding the linker to the inorganic particles and the polymer can be selected to achieve the desired processing effectiveness. Once sufficient time has passed to complete the bonding between the components of the composite, the composite can be processed further.

The ratio of linker composition to inorganic particles preferably is at least one linker molecular per inorganic particle. The linker molecules surface modify the inorganic particles, i.e., functionalize the inorganic particles. While the linker molecules bond to the inorganic particles, they are not necessarily bonded to the inorganic particles prior to bonding to the polymers. They can be bonded first to the polymers and only then bonded to the particles. Alternatively, the components can be blended such that bonding between the linker and the two species occurs simultaneously.

The linker compound and the polymer/monomer components can be added to the liquid with the particle dispersion simultaneously or sequentially. The order of combining the various constituents can be selected to achieve the desired results. The conditions within the liquid preferably are suitable for the bond formation with the linker and possibly other bond formation involving the polymer/monomer constituents. Once the composite is formed, the liquid can be removed or solidified to leave behind a structure formed from the composite.

The polymer/monomer composition can be formed into a solution/dispersion prior to addition to the inorganic particle dispersion, or the polymer/monomer can be added as a solid to the particle dispersion. In preferred embodiments, the polymer/monomer compositions are soluble in the liquid used to form the particle dispersion. If the polymer/monomer is not soluble/dispersible in the particle dispersion, either the polymer/monomer solution or the particle dispersion is slowly added to the other while mixing to effect the reaction. Whether or not the polymer/monomer is first solubilized separate from the inorganic particle dispersion may depend on the kinetics of the polymer/monomer solubilization and on the desired concentrations of the various solutions/dispersions. Similarly, bonding kinetics can influence the order and details of the mixing procedures.

In some embodiments, the reaction conditions and/or the presence of a catalyst or the like is needed to initiate the reaction of the linker with the inorganic particle and/or the polymer/monomer. In these embodiments, the components can be mixed prior to the adjustment of the reaction conditions of the addition of a catalyst. Thus, a well mixed solution/dispersion can be formed prior to the adjustment of the reaction conditions or addition of the catalyst to form a more uniform composite.

Structures Incorporating Polymer-Inorganic Particle Blends

While the blends can be formed into free standing structures, structures of interest can involving interfaces between a polymer-inorganic particle blend and another material. The other material at the interface may or may not itself be a polymer-inorganic particle blend. The interface can be along a planar surface, along an edge of an extended material and/or along other types of surface either simple or complex. In some embodiments of interest, the polymer-inorganic particle blend is an optical material. In these embodiments, the other material may also be an optical material such that the interface is an optical interface. The interfaces can be incorporated into particular structures to form devices of interest.

Referring to FIG. 1, structure 100 includes a first layer 102 of polymer-inorganic particle blend and a second layer 104 of a second material. First layer 102 contacts second layer 104 at interface 106. In this embodiment, interface 106 is planar, although other non-planar interfaces of simple or complex geometry can be formed. Additional layers can be formed from polymer-inorganic particle blends and/or other materials. Specifically, the structure can include three or more layers with adjacent layers having the same or different compositions. If adjacent layers both are polymer-inorganic particle blends, the layers can differ with respect to the polymer, the inorganic particles and/or particle loadings. In particular, adjacent layers can have different particle loadings to adjust the differences in index-of-refraction between the adjacent materials. The optical properties within a layer depend on the index-of-refraction as well as the dimensions including, for example, thickness. Planar structures, such as shown in FIG. 1, have lengths in two dimensions that are at least an order of magnitude, i.e., a factor of 10, larger than a thickness along a dimension perpendicular to the two extended dimensions.

Referring to FIG. 2, structure 112 has a first material 114 comprising a polymer-inorganic particle blend and a second material 116. First material 114 and second material 116 form an interface 118 along an edge. An edge has at least one dimension that is at least an order of magnitude smaller than an extended length dimension of the structure. A more complex structure is depicted in FIG. 3. Structure 124 includes a first material 126 comprising a polymer-inorganic particle blend, a second material 128 and a third material 130. First material 126, second material 128 and third material 130 contact each other at interfaces 132, 134, 136, 138. Various other structures involving polymer-inorganic particle blends can be formed including, for example, more complex structures with corresponding complex interfaces between adjacent materials and/or structures with a network of interfaces that may form optical pathways through the structure.

Generally, one of the materials within the structures of interest comprises a polymer-inorganic particle blend. Suitable relative proportions and compositions of the components of the blend are described in detail above. Specific compositions can be selected based on the desired properties, such as index-of-refraction, of the material within the structure. The polymer-inorganic particle blend can be a mixture or a composite. Polymer-inorganic particle composites generally are more stable and have more dispersed inorganic particles compared with mixtures, assuming appropriate processes are used to form the composites. In addition, a polymer-inorganic particle blend material can further comprise, for example, other polymers, such as organic or inorganic polymer particles and/or non-polymer, non-particulate property modifiers, for example, viscosity modifiers, antioxidants, plasticizers, dyes and the like. Polymer-inorganic particle composites can also include polymers that are not bonded to the inorganic polymers or crosslinked to the polymer bonded to the inorganic particles. These non-bonded polymers may or may not have the same chemical composition as the polymer bonded to the inorganic particles of the composite. Similarly, a polymer-inorganic particle composite can include non-bonded inorganic particles in addition to the bonded inorganic particles. The non-bonded inorganic particles may or may not have the same properties, such as composition, crystallinity, average size and size distribution, as the bonded particles.

The other material(s) in a structure may or may not also be polymer-inorganic particle blends. For example, the other materials can be polymers or non-polymer inorganic materials. Specifically, the polymer may or may not be the same polymer used in an adjacent polymer-inorganic particle blend. Suitable polymers for incorporating into structures include, for example, the polymers that can be incorporated into the blends, as described above. These polymers not formed into blends can be combined with additives, such as viscosity modifiers, plasticizers, antioxidants, dyes and the like. When polymers are placed adjacent polymer-inorganic particle blends, the nature of the polymers and inorganic particles in the adjacent layers generally determines the nature of the interface. With respect to other materials at the interface, suitable non-polymer inorganic materials include, for example, elemental metals, metal alloys, metal/metalloid compositions, carbon materials, such as graphite and amorphous carbon, and the like. Non-polymer inorganic materials include crystalline and amorphous compositions that are not covalently bonded into linear polymer units. For the formation of optical structures, suitable inorganic materials include, for example, $TiO_2$, $SiO_2$, $GeO_2$, $Al_2O_3$, $P_2O_5$, $B_2O_3$, $TeO_2$, and combinations, mixtures and doped versions thereof. Non-linear optical materials, such as zinc oxide, $KTaO_3$, $K(Ta,Nb)O_3$, $YVO_4$, cadmium sulfide (CdS), cadmium selenide (CdSe), indium phosphide (InP), lithium niobate ($LiNbO_3$), and barium titanate ($BaTiO_3$), can be used within an optical structure to modulate the wavelength, e.g., generate harmonics of incident light, and/or for optical bistable or switch function as a function of light power resulting from a non-linear power response, which can be desirable in some optical devices. Dopants can be used to increase the performance of the non-linear optical materials. Suitable cadmium precursors for aerosol delivery into a laser pyrolysis apparatus include, for example, $CdCl_2$, and $Cd(NO_3)_2$, and suitable indium precursors for aerosol delivery into a laser pyrolysis apparatus include, for example, indium trichloride ($InCl_3$). In addition, small crystalline nanoparticles, e.g., no more than about 20 nm, can exhibit non-linear properties due to imperfections that result in a loss of inversion symmetry. These symmetry-breaking effects are enhanced due to the small particle size. Thus, small nanoparticles, such as crystalline silicon, can be used to take advantage of non-linear optical effects. For optical applications, it is desirable to have materials with large second order and/or third order electrical susceptibilities ($\chi^{(2)}$ and $\chi^{(3)}$) to obtain larger optical non-linearity effects.

One or more materials within the structures can be an optical material. In particular, one or more optical materials can be incorporated within the structure such that the structure is an optical structure. Optical structures can incorporate one or more optical devices, that can be used to transmit and or manipulate light within the structure. As used herein, an optical material includes materials that can transmit light, with selected wavelengths, with low loss due to scattering and absorption. In particular, for transmission applications, optical materials have a propagation loss at a particular wavelength in the infrared, visible or ultraviolet of no more than about 20 percent over 1 centimeter, although desirable materials have significantly lower propagation losses. Useful optical materials can be absorbing at some wavelengths and transmitting at other wavelengths. For example, amplifiers materials can absorb in ultraviolet and/or visible and transmit in the visible or infrared. In other embodiments, optical materials emit at desired frequencies upon excitation by absorption or electrical stimulation. Thus, phosphors and the like can be incorporated into polymer-inorganic particle blends. Nanoparticle phosphors are described further in commonly assigned U.S. patent application Ser. No. 09/843,195, now U.S. Pat. No. 6,692,660 to Kumar et al., entitled "High Luminescent Phosphors," incorporated herein by reference. In some embodiments, phosphors include a host crystal or matrix and a small amount of activator. Suitable host materials for the formation of phosphors include, for example, ZnO, ZnS, $Zn_2SiO_4$, SrS, $YBO_3$, $Y_2O_3$, $Al_2O_3$, $Y_3Al_5O_{12}$ and $BaMgAl_{14}O_{23}$. Generally, heavy metal ions or rare earth ions are used as activators.

In particular, in some embodiments of interest, the polymer-inorganic particle blend is an optical material. Generally, the composition of the polymer and the inorganic particles are selected appropriately to form an optical material with desired optical properties. Similarly, the particle loadings are selected to yield desired optical properties of the resulting blend. In preferred embodiments, the blend is a composite to provide desired amounts of stability at high particle loadings during processing into desired structures.

The polymer-inorganic particle blends provide for continuous selection of index-of-refraction over wide ranges. The index-of-refraction of the blend generally is expected to be approximately a linear combination by the weight ratios of the index-of-refraction of the inorganic particles and the polymer. Any non-linearities in the dependence of index-of-refraction as a function of particle loadings can be accounted for empirically based on measurements of the index-of-refraction. To form high index-of-refraction materials, high particle loadings are generally used with the inorganic particles correspondingly being selected for a high index-of-refraction. Thus, the pure polymer generally would provide the lower limit on the index-of-refraction for the blend. The upper limit on the index-of-refraction for a blend as a function of particle loading would be the index value at the highest particle loadings. Specifically, $TiO_2$ generally has a high index-of-refraction with values ranging from about 2.5 to about 2.9. InP and other phosphides, for example, have indices-of-refraction greater than 3. $SiO_2$ generally has a relatively low index-of-refraction from about 1.45 to about 1.5. Suitable polymers generally have a low index of refraction from about 1.3 to about 1.6. Thus, polymer-inorganic particle blends can be formed with an index-of-refraction up to 2.7 or more. With interfaces between a polymer-inorganic particle blend and a polymer or another polymer-inorganic particle blend, the differences in index-of-refraction can be as small as desired or, in some embodiments, from 0.001 to about 1.5 or more.

The use of nanoparticles within the blends has the advantage for optical materials of higher transparency and reduced scattering of light relative to optical properties of corresponding blends when using larger inorganic particles. Nanoparticles are especially effective in reducing scattering in the infrared portion of the electromagnetic spectrum including wavelengths of about 0.8 microns to about 5.0 microns. Thus, polymer-inorganic particle blends formed with the nanoparticles will have correspondingly lower scattering.

For embodiments in which the polymer-inorganic particle material is an optical material, the adjacent material at the interface can also be an optical material such that an optical interface is formed. The other optical material at the interface can be a polymer, a polymer-inorganic particle blend or a uniform inorganic material. Polymers can be used especially to form a low index-of-refraction material. Polymer-inorganic particle blends can be used to incorporate desired index differences between the materials at the interface and to incorporate desired optical properties to the second material. Suitable uniform inorganic materials include, for example, optical glasses, such as silica glasses and doped silica glasses, and crystalline or polycrystalline materials, such as quartz.

The difference in index-of-refraction between the two materials at the interface generally is selected to form a desired device incorporating the structure. In general, the difference in index-of-refraction is at least about 0.0025, in other embodiments at least about 0.005, and in further embodiments at least about 0.01. In some embodiments, relatively small differences are sufficient to confine the light and to control the propagation modes. In alternative embodiments, a larger difference in index-of-refraction is used to obtain desired functionality. Thus, it may be desirable to have a difference in value of the index-of-refraction between the two materials at least about 0.05, in further embodiments at least about 0.1, in other embodiments from about 0.2 to about 2.5 and in further embodiments from about 0.5 to about 2.0. A person of ordinary skill in the art will recognize that other values for the differences in value of index-of-refraction between these explicit differences are contemplated and are within the present disclosure.

The transition between two materials with different indices-of-refraction can be formed with a gradual or continuous change between the materials. The reflection is a function of the difference in index-of-refraction between two materials at an interface. The evaluation of transmission and reflection at an interface between two optical materials with different indices-of-refraction can be calculated using well known optical formulas. Since the function is non-linear, i.e., quadratic, with respect to the index-difference, the loss due to reflection at the interface can be reduced or eliminated. This reduction in reflection can be especially significant for transitions between materials with a large difference in index-of-refraction between the two materials.

The optical interfaces can be used to form optical devices with simple or complex structures and/or functionalities. For example, the polymer-inorganic particle blends can be used to form passive optical devices such as waveguides/optical channels and couplers/splitters and the like. The polymer-inorganic particle blends can be used for the core and/or for the cladding of the devices. The waveguides and the like, for example, can be within an optical fiber or on a planar optical structure. Referring to FIG. 4, waveguide 140 has a core 142 surrounded by cladding 144. Generally, core 142 has a higher index-of-refraction than cladding 144 such that light is confined within the core by total internal reflection. The difference in index-of-refraction can be selected to limit the modes of transmission of light at a particular wavelength. If the core and cladding are both formed from polymer-inorganic particle blends, the difference in index-of-refraction can be tuned by selecting the particle loading, composition of the polymer and/or composition and other properties of the inorganic particles. Referring to FIGS. 5 and 6, a coupler/splitter 146 is shown with a core material 148 surrounded by cladding 150. Appropriate dimensions of the core orthogonal to the propagation direction depend on the index-of-refraction and the wavelength of light. Generally, however, the dimensions across the cross section of a waveguide are within an order of magnitude of the wavelength of light. Thus, for most optical applications, the light channels have dimensions less than about 10 microns.

In planer embodiments of optical structures, waveguides and comparable elements, such as those in FIGS. 4-6, have a layered structure, generally on a substrate. In these embodiments, a polymer-inorganic particle blend can be used as an over-cladding on top of core and/or under-cladding of a uniform inorganic optical material, such as a silica glass, to form an athermal waveguide. In particular, the presence of the polymer-inorganic particle blend can compensate for thermal stresses within the structure if the index-of-refraction of the polymer-inorganic particle blend is selected to account for index of refraction changes in the structure due to the presence of thermal stress.

The polymer-inorganic particle blends and corresponding interfaces with a second material can be incorporated into devices of interest. Suitable devices can be optical devices. Devices that can be formed with polymer-inorganic particle blends include, for example, interconnects, reflectors, displays, micro-electromechanical structures (MEMS), tunable filters and optical switches. MEMS structures can be incorporated into optical devices, for example, to adjust distances between components. Other devices of interest have periodic variations in index-of-refraction, as described below.

Figure 7B:
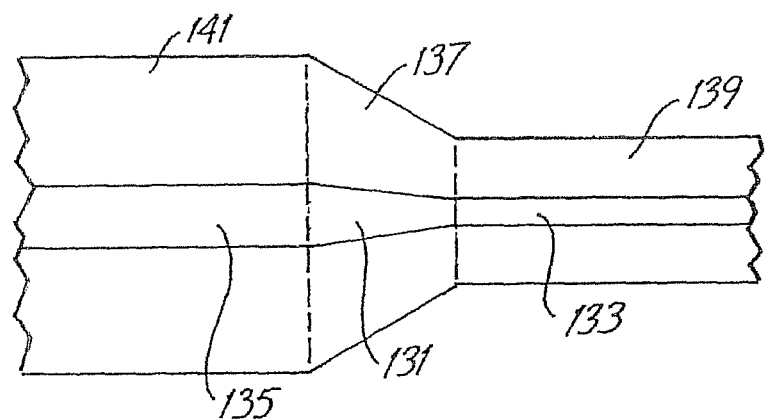
FIG. 7B is a sectional view of an interconnect that tappers between a first waveguide and a second waveguide.

Low loss interconnects are depicted in FIGS. 7A and 7B. Referring to FIG. 7A interconnect 151 comprises a core 152 within cladding 153. Core 152 connects a first, high index, material 154 with a second, low index, material 155. Core 152 further comprises an interconnect transition 156. Interconnect transition 156 comprises a one or more layers 157 with indices-of-refraction intermediate between the index of first material 154 and second material 155. Layers 157 have a gradual, monotonic, transition in index-of-refraction with a higher index-of-refraction toward first material 154 and a lower index-of-refraction toward second material 155. The thickness and number of layers can be selected to reduce the loss to arbitrarily small values due to reflection of light transmitted between first material 154 and second material 155. By making the layers smaller and increasing the number of layers, interconnect transition can be made to approximate a continuous transition in index with a loss approaching zero. Interconnect transition 157 can be formed from polymer-inorganic particle blends. The index can be changed conveniently in a step-wise way or, alternatively, continuous way by altering the particle loading, although the index can also be altered by changing the composition of the polymer and/or inorganic particles. First material 154 and second material 155 can each be an optical polymer, a polymer-inorganic particle blends or a densified inorganic optical material, such as a doped silicon oxide glass.

With a change in index-of-refraction, appropriate cross-sectional areas of the core region of a waveguide, either fiber or planar, can be altered without changing the propagation of the light. In particular, with an increase in index-of-refraction, the core can be made thinner and/or narrower. The interconnect can then correspondingly change size gradually or step-wise along with the change in index-of-refraction. Referring to FIG. 7B, interconnect core 131 connects between high index core 133 and low index core 135. As shown in FIG. 7B, interconnect core 131 gradually tapers in thickness from a thinner dimension adjacent high index core 133, which is correspondingly thinner than low index core 133, to a thicker dimension adjacent low index core 135. The index of refraction can change in a continuous or step-wise way. Similarly, in alternative embodiments, the thickness of interconnect core 131 can change in a step-wise way. Interconnect cladding 137, thinner cladding 139 and thicker cladding 141 can be formed all from the same material, with the same index-of-refraction, or from different material, with correspondingly different indices-of-refraction. Interconnect cladding 137 can change in thickness and/or index-of-refraction in a Step-wise or continuous way.

Figure 8:
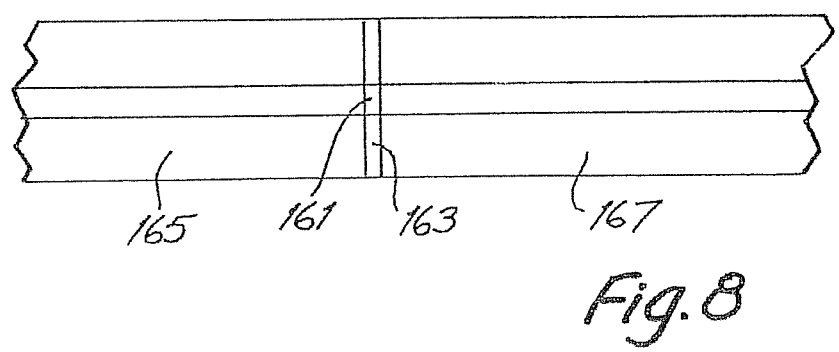
FIG. 8 is a sectional view of a polymer-inorganic particle blend used as an optical adhesive to connect two optical channels.

In addition, the polymer-inorganic particle blends can be used as a glue between two other optical materials. The polymerization and/or crosslinking can be completed following application of the blend as an interconnect between two materials. Completion of the polymerization/crosslinking can physically connect the two materials and provide a continuous optical path. The index-of-refraction of the polymer-inorganic particle blend can be selected, as described herein, to approximately match the other materials to reduce the loss. Due to high available particle loadings the optical glue can have a high index-of-refraction. Polymer alone or a lower index polymer-inorganic particle blend can be added as a cladding that polymerizes or crosslinked to completion following application to further assist with the physical binding of the materials. Such an embodiment is shown in FIG. 8. Core glue 161 and cladding glue 163 connect first optical conduit 165 and second optical conduit 167. Core glue 161 comprises polymer-inorganic particle blend.

Figure 9:
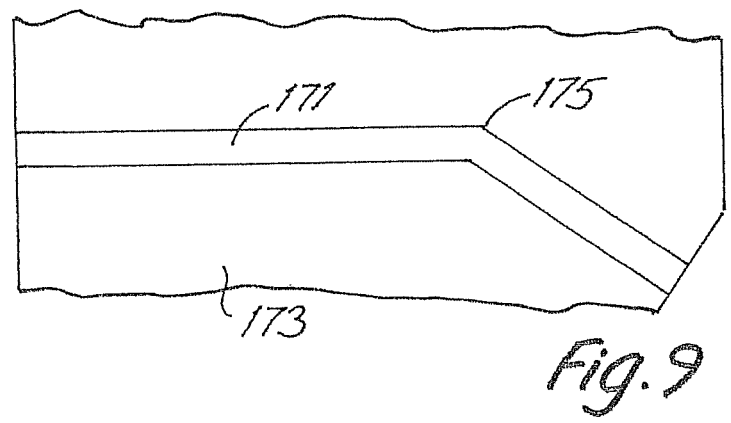
FIG. 9 is a sectional side view of an optical channel with a bend.

Light is generally transmitted through waveguides due to total internal reflection since the core has a higher index-of-refraction than the surrounding cladding. Loss can occur due to bending of the core if the index-difference between the core and cladding is not large enough to confine the light within the core at the angles of incidence at the bend. If the difference in index-of-refraction between the core and the cladding is larger, sharper bends in the core can be made without incurring loss in optical transmission. The polymer-inorganic particle blends can be formed with a relatively high index-of-refraction, as described above, such that a larger difference in index between the core and cladding can be formed. An appropriate degree of bending can be evaluated using conventional optical formulas. Thus, bends with a greater angle can be achieved relative to bends involving materials with a lower achievable index-of-refraction. A bend is depicted in FIG. 9. Core 171 is surrounded by cladding 173. The angle at bend 175 can be selected based on the difference in index-of-refraction to yield no loss or an acceptably small loss. Reflectors/bends with sharper angles can be used to form optical devices in a smaller footprint.

Suitable displays include, for example, reflective-type displays. In some embodiments, the polymer-inorganic particle blends can replace conventional polymers within a polymer-dispersed liquid crystal display. By selecting the desired index-of-refraction for the polymer-inorganic particle blend, the index-of refraction can be matched better to the adjacent materials such that less undesirable reflection takes place. With less undesirable reflection, the display element can have a sharper image. General features of polymer-dispersed liquid crystal displays are described further in U.S. Pat. No. 6,211,931 to Fukao et al., entitled "Polymer-Dispersed Liquid Crystal Composition And Liquid Crystal Display Elements Using The Composition," incorporated herein by reference.

Figure 10:
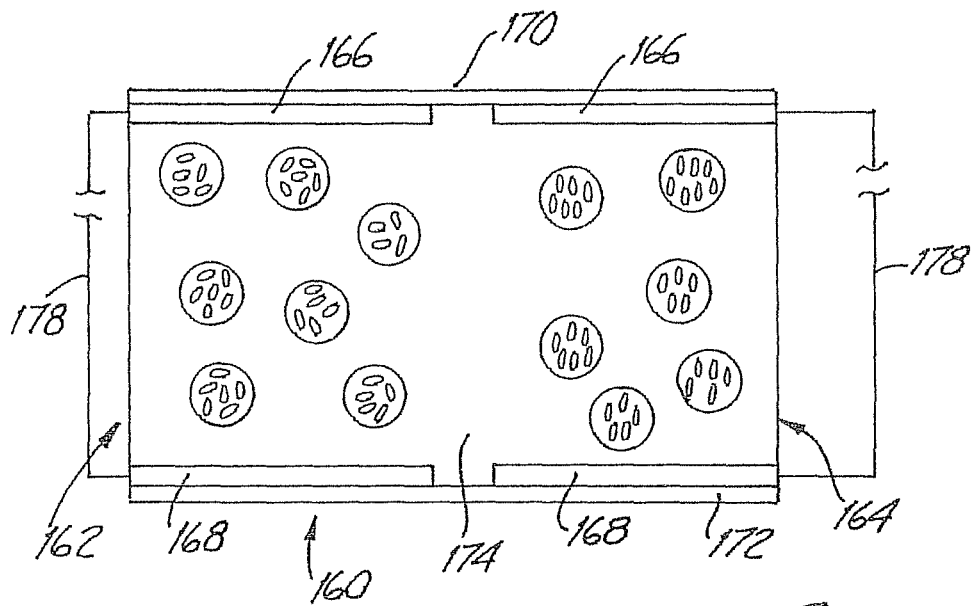
FIG. 10 is a sectional side view of a reflection-type, polymer-dispersed liquid crystal display device with two display elements shown with the section taken through the center of the elements.

A portion of an embodiment of a polymer-dispersed liquid crystal display is shown in FIG. 10. Display 160 has a first element 162 and a second element 164. Each element has a transparent electrode 166 and a transparent counter electrode 168 in a spaced apart configuration. Transparent electrodes can be formed, for example, from indium tin oxide. An outer transparent cover 170 covers the viewing side of display 160. A black absorbing layer 172 is located past transparent counter electrodes 168 on the side of display 160 opposite transparent cover 170. Polymer-inorganic particle blend 174 is located between transparent electrodes 166 and transparent counter electrodes 168. Liquid crystal droplets 176 are dispersed within blend 172. Liquid crystal droplets 176 can be microcapsules or located within voids in the blend. Liquid crystal droplets can include liquid crystals, such as cyanobiphenyl-based liquid crystals (produced by Merck Corp.) and can include dyes.

Electrodes 166, 168 are connected to control circuitry 178 for the selective application of an electric current to electrodes 166, 168 thereby generating an electric field between transparent electrodes 166 and transparent counter electrodes 168. When current is not applied, the liquid crystals are randomly oriented, as shown in element 162, such that incoming light through transparent cover 170 is scattered and element 162 has a color based on the dye. When an electric field is applied, the liquid crystals align, as shown in element 164, such that more light is transmitted to black absorbing layer 172 and the element appears dark or off. Thus, when no electricity is applied, the display looks white from reflection from all the elements. If the polymer-inorganic particle blend has an index-of-refraction closer to the index-of-refraction of the liquid crystal droplets, greater amounts of light can be transmitted to the black absorbing layer when electricity is applied such that off elements are darker, i.e., the contrast between on and off elements can be greater.

The polymer-inorganic particle blends can be incorporated into micro-electromechanical systems (MEMS), especially for optical applications, although non-optical applications are also contemplated. Microelectro-mechanical systems for convenience will be used generally to refer also to both micron scale systems and submicron scale systems, nano-electro-mechanical systems. MEMS systems generally include a microactuator that can deflect in response to applied stimuli, such as electric fields, magnetic fields or thermal changes. For example, piezoelectric crystals undergo a strain when an electric field is applied such that a deformation related to the magnitude of electric field results. Suitable piezoelectric materials include, for example, quartz, barium titanate, lead zirconate-lead titanate and polyvinylidenefluoride. Similarly, paramagnetic materials can be used which can be designed to deflect in a magnetic field, such as from an electromagnet. Thermal-based actuators can be formed from interfaces between materials with differences in coefficients of thermal expansion.

The polymer-inorganic particle blends can be incorporated into the actuator element and/or into an extension from the actuator with functional properties, such as desirable optical properties. In particular, an element comprising a polymer-inorganic particle blend can extend from a MEMS actuator, in which the element functions as a mirror or a lens. An actuator-based optical element can be incorporated into optical devices, such as a tunable filter and or a tunable laser. These structures are discussed further in the context of the following figures. With respect to incorporation into the actuator element itself, the polymer and/or the inorganic particles can be active with respect to actuator functionality. Specifically, the polymer and/or the inorganic particles can be piezoelectric materials, paramagnetic materials or materials with a desired coefficient of thermal expansion. Similarly, the material can have desired optical properties for incorporation into an optical device as a movable optical element.

Figure 11:
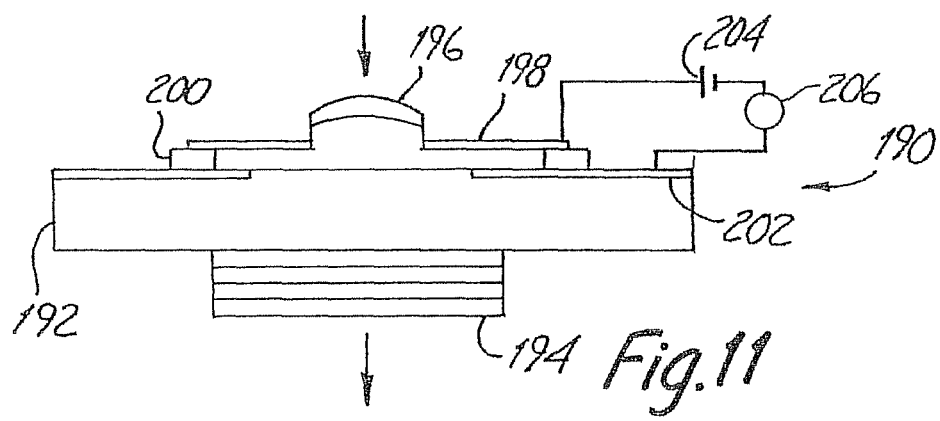
FIG. 11 is a sectional side view of a tunable vertical cavity surface-emitting laser incorporating a micro-electromechanical system with the section taken through membrane mounting post of the micro-electromechanical system.

A tunable vertical cavity surface-emitting laser (VCSEL) is shown in FIG. 11. Laser 190 includes a substrate 192 with a bottom mirror 194. Top mirror 196 is mounted on a membrane 198, which can be formed from piezoelectric material. Membrane 198 is mounted on posts 200. Electrode 202 is located along the top surface of substrate 192. Membrane 198 and electrode 202 are connected to an appropriate power source 204 and a variable resistance 206. Membrane 198 and electrodes 202 form a portion of a MEMS device incorporated into the tunable laser. The distance between mirrors 194, 196 determines the frequency of the laser. The position of top mirror 196 is adjusted by providing a selective amount of current using variable resistance 206. Since membrane 198 is formed from piezoelectric material, membrane 198 deforms a particular amount according to the amount of current applied. A pump pulse can be supplied through top mirror 196 into the laser cavity. The wavelength of the corresponding emissions through bottom minor 194 depends on the position of top mirror 196. The lasing wavelengths for a mode m is given by $\lambda_m = 2$ nL/m, where n is the index of refraction within the lasing cavity and L is the distance between the mirrors. The peak gain is also a function of the distance between the mirrors. The general structure of VCSELs is described further, for example, in U.S. Pat. No. 6,160,830 to Kiely et al., entitled "Semiconductor Laser Device And Method Of Manufacture," incorporated herein by reference.

In tunable vertical cavity surface-emitting laser 190, one or more components can be formed from the polymer-inorganic particle blends. In particular, membrane 198 and/or top mirror 196 can be formed from blends described herein. The index-of-refraction of top mirror 196 can be selected to yield the desired optical properties. Furthermore, membrane 198 can be formed from a polymer-inorganic particle blend in which the polymer and/or the inorganic particles have piezoelectric properties such that the application of current to the electrodes can result in deformation of membrane 198. Additionally or alternatively, one or more other components of laser 190 can be formed from the blends.

Wavelength selective components are useful for performing wavelength division multiplexing within networks to increase bandwidth. Suitable dispersive elements include, for example, diffraction gratings, prisms and the like. An arrayed waveguide grating is another wavelength selective component of interest. An arrayed waveguide grating comprises two couplers and an array of waveguide channels, with one couple on each side of the array of waveguide channels. The general principle of arrayed waveguide gratings is described further in U.S. Pat. No. 5,002,350 to Dragone, entitled "Optical Multiplexer/Demultiplexer," incorporated herein by reference.

Figure 12:
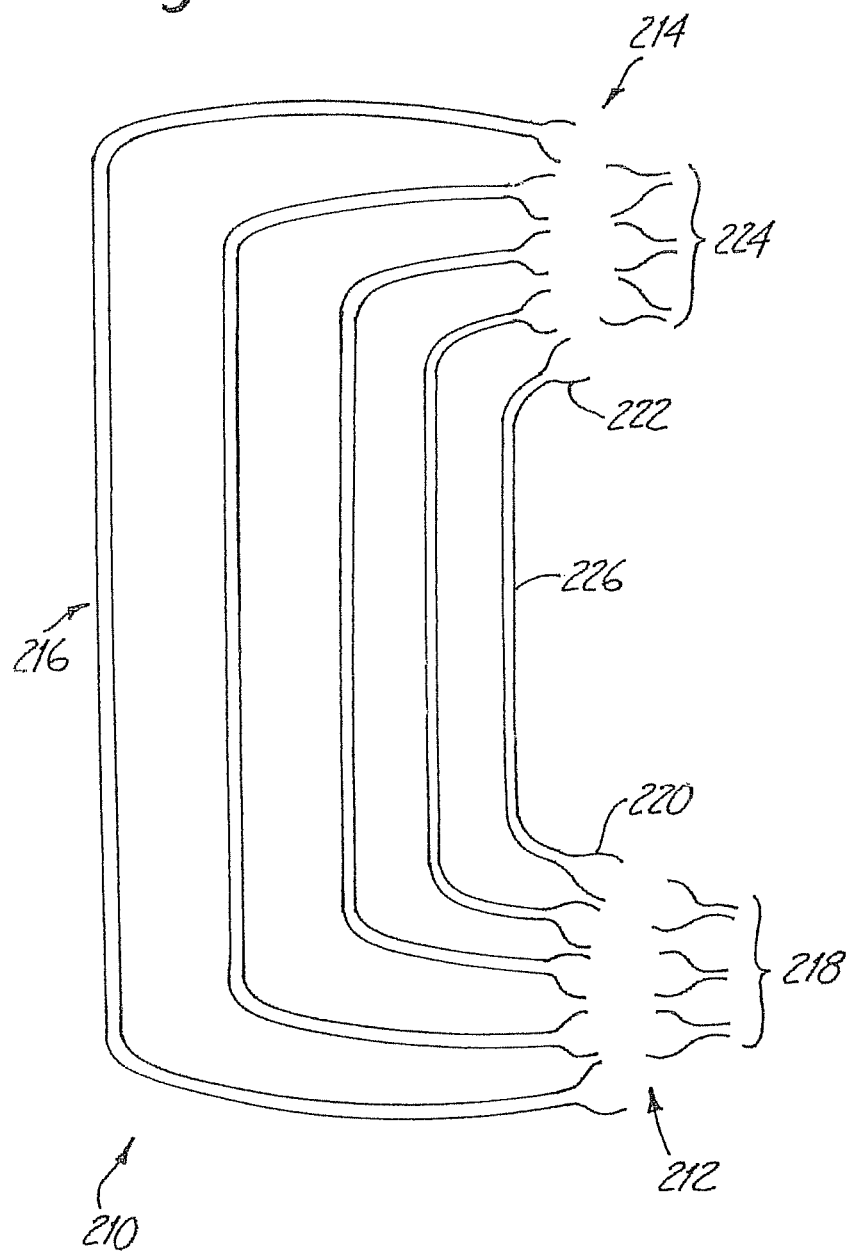
FIG. 12 is a top view of an arrayed waveguide grating.

An embodiment of an arrayed waveguide grating is shown in FIG. 12. Arrayed waveguide grating 210 comprises couplers 212, 214 and an array of waveguides 216. Coupler 212 provides for coupling of an input signal into array 216. At coupler 212, the waveguides of array 216 are strongly coupled. Coupler 212 further is connected to input waveguides 218. In one embodiment, coupler 212 can a physical broadening of the respective waveguide cores of both array 216 and input waveguides 218 and a gap between input waveguides 218 and array waveguides 216 with uniform index-of-refraction such that signals are coupled from the geometry. In some embodiments, coupler 212 includes broadened optical channels 220 that lead to each waveguide of array 216.

Waveguide array 216 comprises a plurality of waveguides 226 with different lengths from each other. The difference in lengths results in a phase shift in the light signals transmitted through the waveguides. The differences in lengths can be selected to result in a desired interference between light of particular wavelength at coupler 214. The interference at coupler 214 can result in a spatial separation of light of different wavelengths. The different wavelength of light can be directed to different spatially displaced output waveguides 224.

In particular, waveguides of array 216 are also strongly coupled at coupler 214. Coupler 214 can include broadened optical channels 222 that lead from waveguides of array 216. Broadened optical channels 222 can be arranged on an arc such that signals from each waveguide interfere. Coupler 214 can further include spatially displaced output waveguides 224 with the spatial separation being responsible for a different frequency portion of the spectrum from the interfering signal from array 216 transmitting through different output waveguides 224.

While the embodiment in FIG. 12 has five waveguides shown, other numbers of waveguides can be used. The number of waveguides and the difference in lengths of the waveguides generally determine the spectral resolution of the wavelength split signal. Active elements can be incorporated into the arrayed waveguide grating to tune the spectral decoupling. For example, an electroactive material and corresponding electrodes can be introduced within one or more of the waveguides of array 216. The use of active elements within an arrayed waveguide grating is described further in U.S. Pat. No. 5,515,460 to Stone, entitled "Tunable Silicon Based Optical Router," incorporated herein by reference. One or more of the elements of the arrayed waveguide grating can comprise a polymer-inorganic particle blend. For example, the core of the waveguides of waveguide array can be a polymer-inorganic particle blend. The index-of-refraction can be selected such that a convenient path length difference is introduced into the waveguide array.

Figure 13:
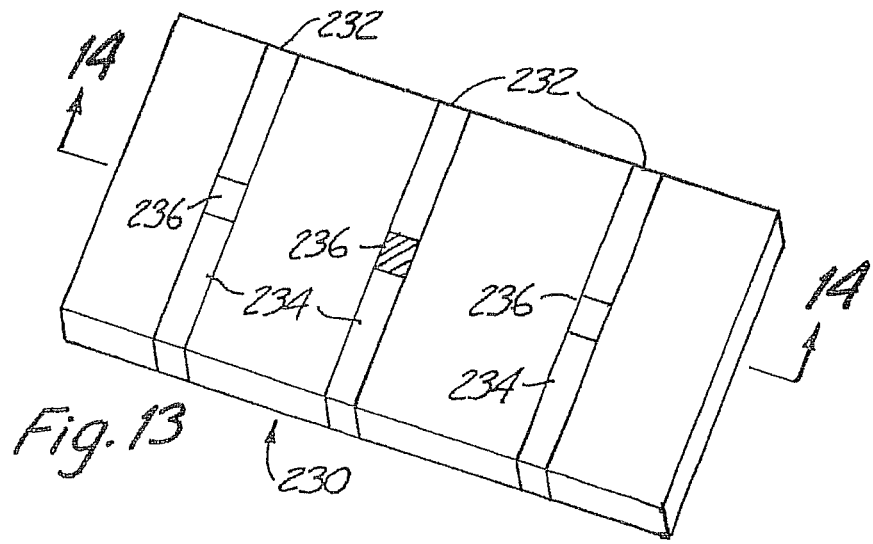
FIG. 13 is a top perspective view of an optical structure with three optical switches formed from polymer-inorganic particle blends.
Figure 14:
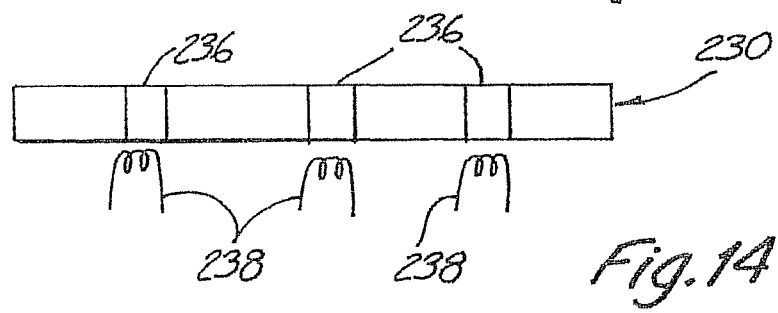
FIG. 14 is sectional side view of the optical structure of FIG. 13 with the section taken along line 13-13.

Similarly, optical switches can be formed with polymer-inorganic particle blends. A planar optical structure 230 with three optical switches 232 is shown in FIGS. 13 and 14. Fewer optical switches, additional optical switches and/or other integrated optical devices can be incorporated into the structure, as desired. For convenience, cladding layers are not shown. Optical switches 232 include cores 234 and switch elements 236. Switch elements 236 comprise a polymer-inorganic particle blend that is thereto-optical. As shown in FIG. 13, the temperature of a switch element 236 is set to adjust the index-of-refraction of the polymer-inorganic particle blend such that the light in the waveguide is not transmitted and the switch is closed. Generally, the temperature of a switch element 236 can be selected to open and close the switch to control light transmission through the switch. As shown in FIG. 14, a thermal element 238, such as a resistive heater or a cooling element, is placed near switch elements 236. Thermal element 238 is used to control the temperature of adjacent switch element 236 to open and close the switch by controlling the index-of-refraction of switch element 236. The polymer-inorganic particle blend within switch elements 236 can include polymer and/or inorganic particle that are thermo-optical. Some polymers have a large negative change in index-of-refraction in response to an increase in temperature. Suitable polymers include, for example, halogenated polysiloxanes, polyacrylates, polyimides and polycarbonates. Suitable thermo-optical inorganic materials include, for example, quartz.

Figure 15:
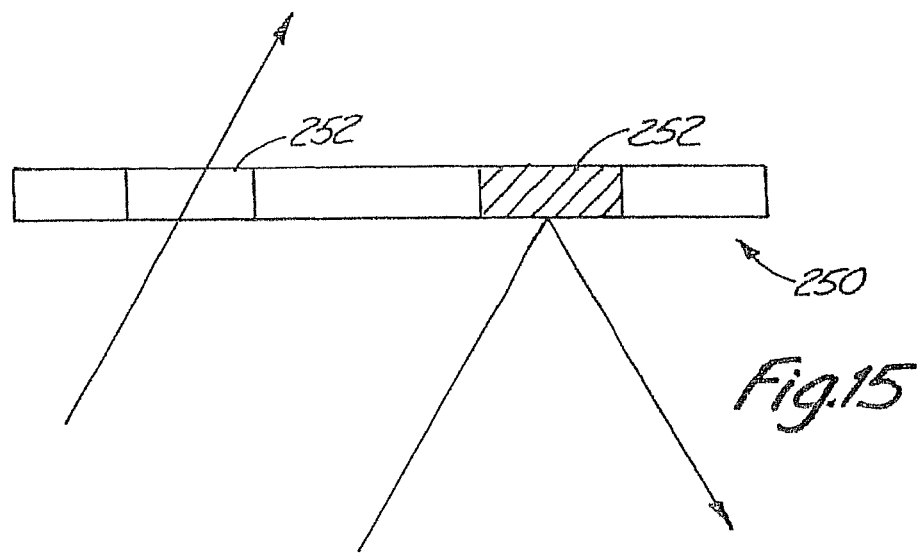
FIG. 15 is a sectional side view of a cross-connect optical switch with the section taken through the switch elements.

A cross-connect optical switch is shown in FIG. 15. As shown in FIG. 15, cross-connect optical switch 250 has two switch elements 252. Additional switch elements and/or integration with other optical devices can be included in the structure, as desired. Switch elements 250 can include thermo-optical, electro-optical or magneto-optical materials. Appropriate electrodes, electromagnets or thermal elements, as appropriate, can be properly placed adjacent switch elements 252 to control the index-of-refraction of switch elements 250. A light path strikes switch elements 250 at an angle. The index-of-refraction of each switch element can be selected to transmit or reflect most of the light as desired.

In some embodiments, structures have periodic formations incorporating polymer-inorganic blends, such as polymer-inorganic particle composites. The structure can have a periodicity in composition and/or property, such as an optical property, in one-dimension, two dimensions or three dimensions. Referring to FIG. 16, structure 254 has a substrate 256 with four periodically spaced bars 258 of polymer-inorganic particle blends. For embodiments in which bars 258 are an optical material, periodically spaced bars 258 result in a periodic variation in index-of-refraction. Generally, bars 258 include the same materials such that they have the same index-of-refraction as each other, although alternative embodiments are described below. As shown in FIG. 16, air or other gas fills the spaces between bars 258 as a second material resulting in periodic interfaces between the polymer-inorganic particle substrate and the gas.

In general, control of optical transmission is obtained by embedding periodic optical materials within a larger structure. Referring to FIG. 17, a three-layered optical structure 260 is shown, in which hidden structure of the layers is shown with dashed lines. Structure 260 includes a first layer 262, a second layer 264 and third layer 266. Second layer 264 includes periodically spaced sections of optical material 268 comprising a polymer-inorganic particle blend. Alternating optical material 270 is located between periodic sections 268. Optical channels 272, 274, which are outlined in dotted lines, extend in either direction from the periodically spaced sections. Optical material 270 may or may not be the same material as the optical material within optical channels 272, 274. Optical channels 272, 274 are oriented approximately along the axis normal to the periodicity of sections 268. Optical channels 272, 274 can function as a waveguide or the like. The index-of-refraction of all of the materials can be selected based on the desired function of periodic sections 268, 270 and optical channels 272, 274.

Figure 19:
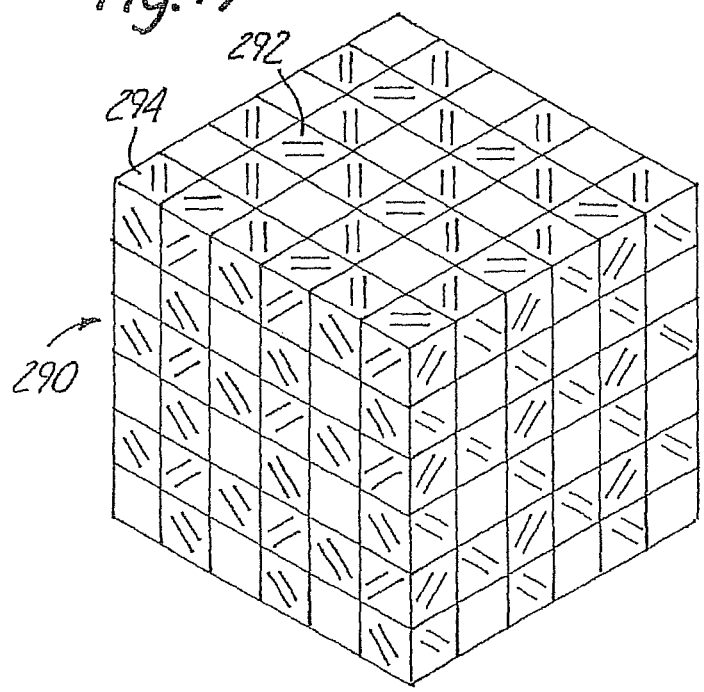
FIG. 19 is a perspective view of an optical structure with a three dimensional array of higher index-of-refraction material, which can be a portion of a larger optical structure.

Referring to FIG. 18, optical structure 280 has a two-dimensional periodic array 282 of alternating optical elements 284, 286. At least, optical elements 284 comprise a polymer-inorganic particle blend. As shown in FIG. 18, another condensed-phase optical material 288, e.g., surrounding core material, is located between around optical elements 284, 286. In some embodiments, optical elements 286 and/or optical material 288 can be a gas. The optical material of elements 286 can be the same as or different from optical material 288. In some embodiments of interest, optical structure 280 can be embedded within a larger superstructure with additional materials and or features, such as structure 260 with three layers 262, 264, 266 and optical channel 270. Similarly, an optical structure 290 with three-dimensional periodicity is depicted in FIG. 19. Optical structure 290 has a three dimensional periodic array of optical elements 292, 294. At least optical elements 292 comprise polymer-inorganic particle blends. Optical elements 294 are located between and around optical elements 292 such that a periodic variation in index-of-refraction results in three dimensions. Optical elements 294 can be formed from a polymer-inorganic particle blend different from the material in optical elements 292 or from a different type of optical material. Optical elements 294 can be formed from the same optical material as a surrounding optical material that integrates the periodic optical structure into a larger optical structure in which the period optical structure 290 is embedded.

For convenience, the period structures in FIGS. 16-19 are depicted with three or four elements in the periodic structure. In further embodiments, the number of elements in each dimension of the periodic structure can be selected to obtain desired optical effects. The optical effect of the periodic structure generally depends on the optical properties of the material within the periodic structure and in particular the difference in index-of-refraction at the interface between the elements of the periodic structure. In particular, optical properties of the period structure depend on the index-of-refraction difference between the periodic elements comprising a polymer-inorganic particle material and the material between the elements comprising the polymer-inorganic particle blend, although both of the alternating optical material in the periodic structure can comprise polymer-inorganic particle blends with adjacent elements having a different composition and/or particle loading. In general, the periodic structure has at least two elements in the period, in further embodiments at least about 3 elements in the period, in other embodiments at least 5 elements in the period, in further embodiments from 2 elements to about 1000 elements, in additional embodiments from 10 elements to about 250 elements and in still other embodiments from 20 elements to 100 elements. A person of ordinary skill in the art will recognize that other ranges within these explicit ranges are contemplated and are within the present disclosure. Generally, for some of the devices of interest, within a structure with periodic variation in index-of-refraction, having a greater difference in index-of-refraction at optical interfaces results in a need for fewer periodic elements in the structure to achieve a desired optical effect. The distance over which the period repeats generally is at least about 10 nm, in further embodiments at least about 20 nm, in other embodiments at least about 50 nm, in additional embodiments from about 20 nm to about 10 microns and in other embodiments from about 50 nm to about 1 micron. A person of ordinary skill in the art will recognize that additional ranges within these explicit ranges are contemplated and are within the present disclosure.

As depicted in FIGS. 16-19, the index-of-refraction varies in a step-wise fashion from one value to another value within the periodic structure. However, by varying particle loadings and/or by using different composition of inorganic particles, a continuous or gradual step-wise change in index-of-refraction can be achieved. Gradual step-wise variation in index-of-refract can have desirable optical properties relative to step-wise variation between upper and lower limits in index-of-refraction. Such versatility in index selection can be used to approximate desired continuous functions of index-of-refraction as a function of distance, for example, by using a plurality of step-wise changes within the periodic structure. In particular, it may be desirable to have approximately a sinusoidal variation in index-of-refraction. Such a structure is expected to give rise to a single reflection peak without the presence of any higher order harmonics. A real space structure with a refractive index profile made up of only a few (preferably a single) harmonic will result in a reflection spectrum containing only a few (or preferably a single) peak. Tuning the amplitude and wavelength of the sinusoidal variation of refractive index influences the strength of the light's interaction with the stack (structure) as well as the wavelength of the light interacting with the stack, respectively.

Figure 20:
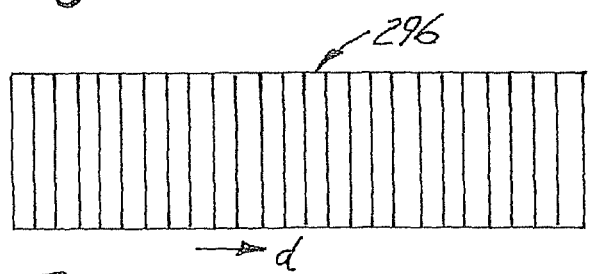
FIG. 20 is a top view of an optical structure with a step-wise gradual change in index-of-refraction to form a periodic variation in index-of-refraction.
Figure 21:
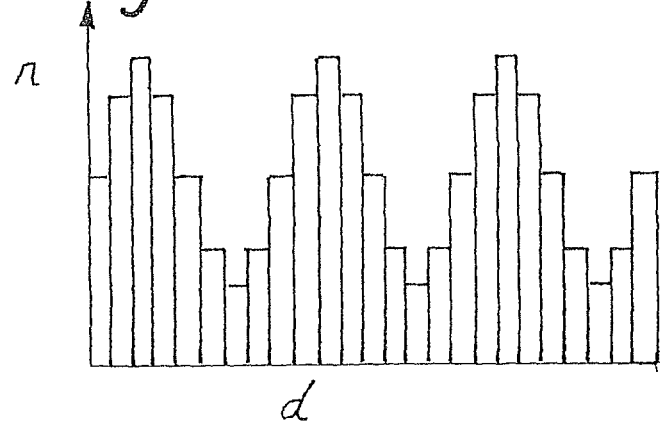
FIG. 21 is a plot of index-of-refraction as a function of distance for the optical structure of FIG. 20.

Referring to FIG. 20, periodic structure 296 has a periodic change in index-of-refraction with step-wise changes in index. The step-wise changes approximate sinusoidal variation in index-of-refraction. The periodicity and the step-wise changes can be seen in the plot of index-of-refraction (n) as a function of distance "d" along the structure in FIG. 21. The number of steps in each period and the number of periods can be selected to achieve desired optical effects. Structure 296 can be incorporated into larger superstructures as desired. In addition, similar step-wise variation in index-of-refraction can be introduced within two-dimensional and three-dimensional periodic structures.

Periodic variations in index-of-refraction within an optical structure can be referred to as gratings (1-dimensional) or photonic crystals (1-dimensional, 2-dimensional or 3-dimensional). These devices can be used to form various optical devices. Thus, the ability to form these periodic variations in index-of-refraction provides a convenient approach to the formation of integrated optical devices. Having an ability to select the index-of-refraction differences provide increased flexibility in device design. In particular, being able to form, using convenient processing approaches, interfaces with increased differences in index-of-refraction allows for the formation of smaller devices.

Periodic index-variation in one-dimension can be used, for example, to form Bragg gratings that have various optical applications. In particular, Bragg gratings can be used, for example, to form optical mirrors and optical band pass filters or interference filters. In general, when light transmitted through an optical material encounters a change in index-of-refraction, a portion of the light is transmitted and a portion of the light is reflected. If the variation in index-of-refraction is periodic, the relative amounts of transmitted and reflected light depend on the difference in index-of-refraction, the number of periodic elements and the wavelength of light. Adjusting the difference in index-of-refraction and the number of periodic elements can be used to transmit and reflect desired portions of the spectrum. Mirrors reflect desired portions of the spectrum. The gratings can be incorporated into other structures such as lasers and the like.

Bragg gratings selectively transmit light wavelengths depending on the number of grating elements and the index-of-refraction differences between the elements of the grating. Bragg gratings reflect some frequencies while transmitting other frequencies. Polymer-inorganic particle blends can be used for one or more components of the grating. By incorporating a blend with an index-of-refraction that depends on electric field or temperature, the filter can be made tunable. The relationships between transmission and reflection wavelengths as a function of grating parameters are described further in U.S. Pat. No. 6,278,817 to Dong, entitled "Asymmetric Low Dispersion Bragg Grating Filter," incorporated herein by reference.

Figure 22:
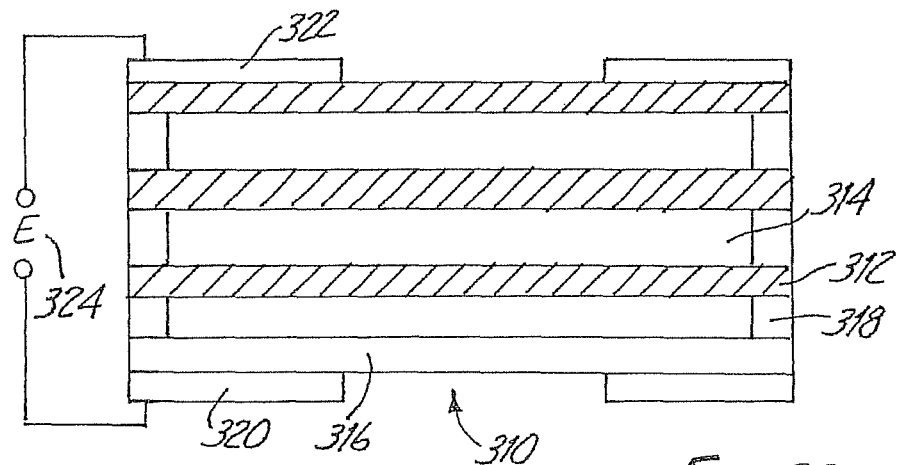
FIG. 22 is a sectional side view of a tunable optical filter with the section taken through the tuning electrodes.

An embodiment of a tunable Bragg grating optical filter with polymer-inorganic particle blends is shown in FIG. 22. Filter 310 includes three layers 312 of polymer-inorganic particle blend interspersed with a low index material 314. The polymer-inorganic particle blend in layers 312 function as an electro-optical material in which the index-of-refraction varies with the application of an electric field. Low index material 314 can be air, a low index polymer, a low index polymer-inorganic particle blend or other low index material. A transparent substrate 316 can be used to support the filter, if desired. Spacers 318 can be used to separate layers 312 in some embodiments. Electrodes 320, 322 can be used to supply an electric field. Electrodes 320, 322 are connected to power source 324, which can provide a variable voltage to electrodes 320, 322 to provide desired tunability. In particular, the index-of-refraction of layers 312 varies with the application of an electric field while the filter function depends on the index-of-refraction of layers 312. While the embodiment shown in FIG. 19 has three alternating index-of-refraction elements with high/low index, a greater number of elements in the grating can be used to achieve desired filtering properties. A greater index difference between the high index and low index components of the grating results in a need for fewer grating elements within the filter to obtain an equivalent resolution in the filtering.

With respect to polymer-inorganic particle blends in layers 312, the polymer and/or the inorganic particles can have an index-of-refraction that depends on electric field. Suitable electro-optical inorganic materials comprise, for example, lanthanum doped polycrystalline lead zirconate titanate, lithium niobate ($LiNbO_3$), $KTaO_3$, $LiTaO_3$, $BaTiO_3$, $AgGaS_2$, $ZnGeP_2$ and combinations thereof and doped compositions thereof. Suitable electro-optical polymers include, for example, polyimides with dissolved chromophores. Other electro-optical polymers are discussed in U.S. Pat. No. 6,091,879 to Chan et al., entitled "Organic Photochromic Compositions And Method For Fabrication Of Polymer Waveguides," incorporated herein by reference. Similar tunability is obtainable with thermo-optical materials within the polymer-inorganic particle blends if the materials are correspondingly thermally controlled.

Lasers can be formed from two Bragg gratings that form the partial mirrors of the laser cavity. Pump beams drive the laser. Such Bragg grating lasers can be formed in optical fibers or as part of planar optical structures. Lasers based on Bragg gratings are described further, for example, in U.S. Pat. No. 5,237,576 to DiGiovanni et al., entitled "Article Comprising An Optical Fiber Laser," incorporated herein by reference.

Figure 23:
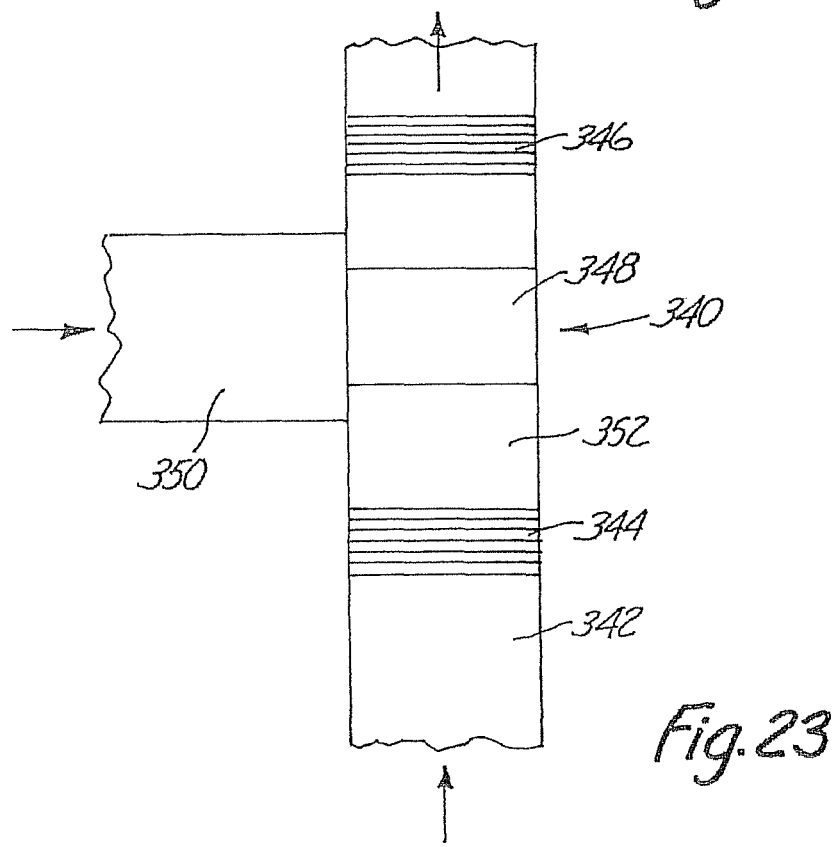
FIG. 23 is a sectional side view of a laser with two Bragg gratings as partial mirrors.

An embodiment of a laser formed with Bragg gratings is shown in FIG. 23. Laser 340 comprises an optical channel 342 with Bragg gratings 344, 346, amplification material 348 and secondary optical pathway 350. Optical channel 342 generally is a core surrounded by cladding in a fiber or in a planar structure. Bragg gratings 344, 346 have periodic variation in index-of-refraction and can incorporate polymer-inorganic particle blends as described above. The characteristics of the gratings can be selected to reflect and transmit particular wavelengths for the laser function. Bragg gratings 344, 346 form the boundaries of a laser cavity 352. The size of the laser cavity determines the modes/wavelengths of the laser emissions. Amplification material 348 is located within laser cavity 352. Amplifier material 348 is optically connected to secondary optical pathway 350. Amplifier material 348 includes materials that absorb light at an amplifier wavelength with a shorted wavelength than the wavelength of the laser. Generally, the amplifier wavelength is in the ultraviolet. Suitable amplifier material includes, for example, rare earth doped amorphous particles. The production of rare earth doped amorphous particles is described, for example, in commonly assigned Provisional Patent application 60/313,588 to Horne et al., entitled "Doped Glass Materials," incorporated herein by reference. These particles can be incorporated into a polymer-inorganic particle blend.

A pump beam is directed into the laser through waveguide 342. The pump beam generally is in the visible or infrared portions of the spectrum. A portion of the pump beam enters the laser cavity. An amplification beam is direct to amplification material 348 through secondary optical pathway 350. The amplification beam can be supplied by an ultraviolet light source, such as an ultraviolet laser or a non-laser light source. Energy from the amplification beam is directed into the laser output by stimulated emission from the amplification material due to the pump beam.

Lattices with periodic variation in index-of-refraction in one-, two- or three-dimensions are referred to as photonic band gap structures or photonic crystals. Photonic crystals have been described as photonic analogs of electronic semiconductors. Photonic crystals can provide a frequency gap covering a range of frequencies of electromagnetic radiation that cannot propagate for any wavevector, i.e., in any direction, including spontaneous emission. Light can be introduced into a photonic crystal by applying light at an angle to the periodic lattice. The frequency gap depends on, for example, the unit cell size, the crystallographic orientation of the periodic structure, the indices-of-refraction including the differences in index between different materials of the lattice and other optical properties. In general, the differences in index-of-refraction between periodic materials of a photonic crystal are at least about 0.1 index units, in other embodiments, at least about 0.2 index units, in further embodiments, at least about 0.5 index units, in additional embodiments from about 0.2 to about 2 index units and in some other embodiments from about 0.5 to about 1.5 index units. A person of ordinary skill in the art will recognize that additional ranges within these explicit ranges are contemplated and are within the present disclosure. In general, the dimensions of the photonic crystal lattice are on the same order of magnitude as the band gap wavelengths.

Defects can be introduced into the photonic crystal to provide for electromagnetic propagation within the forbidden band gap. The defects introduce broken symmetry that interrupts the periodicity. In particular, defects can be variations in the periodic structure with respect to size, location and/or optical properties of an element. Appropriate defects provide for selective propagation of wavelengths. Defects can result from processing limitations with respect to tolerances of the processing approach or they can be purposely introduced. Thus, the photonic crystals with selected defects can be used as optical filters, switches, amplifiers, lasers and the like. In general, photonic crystals involve a difference in index-of-refraction of two or more index units. The evaluation of a photonic band gap for a one-dimensional photonic crystal is given in U.S. Pat. No. 6,002,522 to Todori et al., entitled "Optical Functional Element Comprising Photonic Crystal," incorporated herein by reference. The polymer-inorganic particle blends can be incorporated into periodic optical structures with large variations in index-of-refraction in index-of-refraction between the different materials of the lattice. Periodic optical structures for forming photonic crystals can be formed as described herein. Defects can be introduced by varying the periodic structure. In particular, the periodic structures described above can be used as photonic crystals within an optical structure if the differences in index-of-refraction are sufficient.

The periodic structures, e.g., photonic crystals, can be used in the formation of light absorbing structures, such as antenna and solar cells. In these structures, a light absorbing electron donor, such as a photoconductive polymer, such as a doped polyphenylene vinylene can be placed adjacent the polymer-inorganic particle blend that has a composition to function as an electron accepting material. For example, the inorganic particles within the blend can be fullerenes, other carbon nanoparticles or semiconductive materials with electron holes for accepting the electrons, such as micron sized silicon particles, as described further in U.S. Pat. No. 5,413,226 to Matthews et al, entitled "Apparatus For Sorting Objects According To Size," incorporated herein by reference. Electrodes are placed around the electron donating and electron accepting materials. If one surface is covered with an electrode, the electrode can be a transparent electrode, for example, indium tin oxide. Solar cell structures are described further in U.S. Pat. No. 5,986,206 to Kambe et al., entitled "Solar Cells," incorporate herein by reference.

In addition to periodic structures, optical structures can be formed with polymer-inorganic particle blends that have quasi-periodic or quasi crystalline structures. Quasi-crystal structures can be quasi periodic in one-, two- or three-dimensions. Quasi periodic one-dimensional optical structures are described in U.S. Pat. No. 4,955,692 to Merlin et al., entitled "Quasi-Periodic Layered Structures," incorporated herein by reference. In these quasi periodic optical structures, layers of two different optical materials with different indices-of-refraction can be ordered according to a Fibonacci series with the following orderings, A; AB; ABA; ABAAB; ABAABABA; ABAABABAABAAB, etc. A and B indicate particular optical layered structures. The Fourier spectrum can be evaluated for any of the resulting optical structures. For these and other quasi-periodic structures, the optical performance of an optical device can be modeled using existing computer modeling techniques.

Processing of Composites Into Structures

The polymer-inorganic particle blends generally can be processed using methods developed for polymer processing. In selecting the processing approaches for a blend, appropriate consideration can be given to the physical properties of a particular blend as well as the desired form of the resulting structure. Relevant physical properties include, for example, viscosity, solubility, flow temperatures and stability, although specific properties may only be relevant for certain processing approaches. In particular, after the formation of a polymer-inorganic particle blend, the blend can be further processed for storage and/or for formation into desired structures. The additional processing of the blend following its formation may or may not take place in a solvent. The processing of polymer-inorganic particle composites may be different from the processing approaches for polymer-inorganic particle mixtures. In particular, composites are more stable while the processing of polymer-inorganic particle mixtures may need to maintain the distribution of particles within the polymer. The processing of the polymer-inorganic particle blends can be coordinated with processing approaches for other materials for the formation of interfaces and other components of structures into which the polymer-inorganic particle blends are incorporated.

The blend can be molded, extruded, cast or otherwise processed using polymer processing technology to form various shapes of materials. In addition, the blend can be coated from a solvent-based slurry, spin coated or the like to form a coating of the composite. Any solvent can be removed following the formation of a coating. Similarly, the blend can be crosslinked following coating, whether or not a solvent/dispersant is used in the coating process. Thus, the solidification process can involve solvent/dispersant removal and/or crosslinking, such as thermal crosslinking, crosslinking with ultraviolet light or an electron beam, or by adding a radical initiator. The coatings can be structured using mask techniques. In addition, self-assembly techniques can take advantage of the properties of the components of the composite to assist with the formation of structures on a substrate, especially periodic structures, as described further below. To the extent that self-assembly is used, the self-assembly process is combined with a localization approach that overlays a template as a boundary for the self-assembly approach.

Herein for convenience, the polymer-inorganic particle blend refers to the bonded or unbonded inorganic particle and polymer/monomer material whether in solution, a dispersion, a melt, a coating or a solid form. For example, the properties of a solution/dispersion, such as concentration and solvent composition, containing the polymer-inorganic particle blend can be modified to facilitate the further processing, for storage of the composite and/or for forming structures. Solutions/dispersions that are more dilute generally have a lower viscosity. In some processing approaches, the polymer-inorganic particle composite is processed as a melt.

The solution/dispersion in which the composite is formed can be used directly for further processing. Alternatively, the composite can be removed from the liquid or placed in a different liquid. The liquid of the solution/dispersion can be changed by dilution, i.e., the addition of a different liquid to solution/dispersion, by dialysis to replace the liquid if the composite has sufficient molecular weight to be retained by dialysis tubing, or by removing the liquid and solubilizing/dispersing the composite with the replacement liquid. Dialysis tubings with various pore sizes are commercially available. To substitute liquids, a liquid mixture can be formed, and subsequently the original liquid is removed by evaporation, which can be particularly effective if the liquids form an azeotrope. The polymer/inorganic composite can be removed from a liquid by evaporating the liquid, by separating a dispersion of the complex by filtration or centrifugation, or by changing the properties, such as pH, liquid composition or ionic strength, of the solution/dispersion to induce the settling of the complex from the liquid.

Generally, the composite can be processed using standard polymer processing techniques, including heat processing and solvent processing approaches. For example, the polymer/inorganic particle composite can be formed into structures by compression molding, injection molding, extrusion and calendering. In other words, the composites can be formed into free structures, such as sheets. Similarly, the composites can be formed into fibers or a layer on a fiber using techniques, such as extrusion or drawing a softened form of the composite. Solutions/dispersions can be formed into films/coatings by spin casting and similar methods. Coatings can be formed with various parameters including, for examples, thin coatings with thicknesses less than about 1 micron.

To form structures from the polymer-inorganic particle blends, generally, the blends are processed along with one or more additional materials to form appropriate interfaces within the structures based on desired function. The processing of the polymer-inorganic particle blends can further depend on the properties of associated materials within the structures. Depending on the desired structure, the polymer-inorganic particle blends may or may not be localized within domains within a layer or other extent of the structure.

For the formation of structures from the polymer-inorganic particle blends, the blends can be selectively deposited over appropriate regions or the blends can be selectively removed to leave the desired structure. To selectively deposit the blend, the blends can be deposited, for example, using print technology or using a template. With respect to printing the blend, ink jet technology can be adapted for the printing of the blends in an appropriate solvent/dispersant along desired patterns.

With respect to template technology, standard lithographic approaches using photoresist masks can be adapted for deposition of the blends. For example, the blends can be deposited between gaps in the photoresist. Excess blend outside of the gaps can be removed along with the photoresist. Similarly, sacrifice layers can be used. Sacrifice layers, like photoresist materials, are selectively etched, for example, using a chemical compound, that selectively removes the sacrifice layer after it has functioned as a template. Alternatively, a physical mask can be used. A physical mask has a separate structure apart from the surface, in contrast with sacrifice layers and photoresist layers that are integral with the surface being contoured. Physical masks can be physically removed after the masking process is complete and, in some embodiments, can be reused. Physical masks can be etched or cut, for example, with a laser, from a ceramic material or a metal.

Similarly, a coating of polymer-inorganic particle blends can be deposited, and a selected portion of the blend can be removed to form a pattern. For, example, etching, such as dry etching, can be used to selectively remove the blend. Reactive ion etching, such as reactive oxygen etching, generally is appropriate for the removal of polymer-inorganic particle blends. Lithographic techniques, such as photolithography with photoresist, can be used to shield portions of the blend during the etching process. Alternatively, a focused ion or radiation beam can be used to perform the etching without the need for a mask.

To form periodic structures, the polymer-inorganic particle blends can be deposited using the above noted patterning approaches with a periodic pattern. Alternatively, a period pattern can be formed by taking advantage of self-assembly approaches to facilitate the assembly process. Self-assembly processes take advantage of natural ordering due to molecular ordering and/or molecular recognition. The polymer-inorganic particle blends can exhibit self-organization properties that can be exploited in self-assembly processes.

In particular, to facilitate formation into localized devices, polymers can be selected for self-organization properties that assist the self-assembly. The self-organization properties can be associated with features of a copolymer or from a physical polymer blend. Based on these potential self-organization properties of the polymers, a polymer-inorganic particle blend can incorporate self-assembly to form into a localized structure. Self-assembled structures can be formed from self-assembly with particles segregated to one or another phase of the polymer within the blend, in which different polymer phases are identifiable due to self-organization. In particular, some self-assembly operations naturally form periodic structures that can be used in forming periodic variations in index-of-refraction.

In addition, the formation of localized structures also involves formation of boundaries for the structures. Generally, the self-assembly process forms an ordered network while a localization process forms the boundaries of the self-assembly process. Thus, periodic structures can be formed with the self-assembly process imposing the periodicity while a separate localization process forms the boundary of the periodic structure.

As an example, ordered polymers have properties that can promote natural segregation that can be exploited within a self-assembly framework. Ordered polymers include, for example, block copolymers. Block copolymers can be used such that the different blocks of the polymer segregate, which is a standard property of many block copolymers. Other ordered copolymers include, for example, graft copolymers, comb copolymers, star-block copolymers, dendrimers, mixtures thereof and the like. Ordered copolymers of all types can be considered a polymer blend in which the polymer constituents are chemically bonded to each other. Physical polymer blends may also be used as ordered polymer and may also exhibit self-organization, as described further in commonly assigned U.S. patent application Ser. No. 09/818,141, now U.S. Pat. No. 6,599,631 to Kambe et al., entitled "Polymer-Inorganic Particle Composites," incorporated herein by reference. Physical polymer blends involve mixtures of chemically distinct polymers.

Using ordered copolymers, a portion of the polymer-inorganic particle blend can have a significantly different index-of-refraction than another portion of the blend. Using self-assembly techniques, the portions of the blend with different indices-of-refraction can be ordered to form a physical interface between the materials with the different indices-of-refraction. Furthermore, periodic structures can be used to form periodic variation in the index-of-refraction. Specifically, periodicity of the index-of-refraction can be created in more than one dimension. The one-dimensional and multidimensional variation in index-of-refraction can be advantageously used to form photonic crystals.

Suitable block copolymers for self-organization include, for example, polystyrene-block-poly(methyl methacrylate), polystyrene-block-polyacrylamide, polysiloxane-block-polyacrylate, suitable mixtures thereof and the like. These block copolymers can be modified to include appropriate functional groups to bond with the linkers. For example and without limitation, polyacrylates can be hydrolyzed or partly hydrolyzed to form carboxylic acid groups, or acrylic acid moieties can be substituted for all or part of the acrylated during polymer formation if the acid groups do not interfere with the polymerization. Alternatively, the ester groups in the acrylates can be substituted with ester bonds to diols or amide bonds with diamines such that one of the functional groups remains for bonding with a linker. Block copolymers with other numbers of blocks and other types of polymer compositions can be used.

The inorganic particles can be associated with only one of the polymer compositions within the block such that the inorganic particles are segregated together with that polymer composition within the segregation block copolymer. For example, an AB di-block copolymer can include inorganic particles only within block A. Segregation of the inorganic particles can have functional advantages with respect to taking advantage of the properties of the inorganic particles. Similarly, tethered inorganic particles can separate relative to the polymer by analogy to different blocks of a block copolymer if the inorganic particles and the corresponding polymers have different solvation properties. In addition, the nanoparticles themselves can segregate relative to the polymer to form a self-organized structure.

Polymer blends involve mixtures of chemically distinct polymers. The inorganic particles may bond to only a subset of the polymer species, as described above for block copolymers. Physical polymer blends can exhibit self-organization similar to block copolymers. The presence of the inorganic particles can sufficiently modify the properties of the composite that the interaction of the polymer with inorganic particles interacts physically with the other polymer species differently than the native polymer alone. Even with a single polymer, if the particles are not uniformly distributed within the polymer, the polymer with higher particle loadings can separate from the polymer portions with lower particle loadings to form a self-assembled structure.

Regardless of the self-organization mechanism, some self-organized polymer-inorganic particle blends involve particle, such as nanoparticles, aligned with periodicity in a superstructure or super crystal structure. The particles may or may not be crystalline themselves yet they will exhibit properties due to the ordered structure of the particles. Photonic crystals make use of these crystal superstructures, as described further below.

The self-organization capabilities of a polymer-inorganic particle blend can be used advantageously in the formation of self-assembled structures on a substrate surface. To bind the composite to the surface, the polymer can be simply coated onto the surface or the composite can form chemical bonds with the surface. For example and without limitation, the polymer can include additional functional groups that bond to one or more structures and/or one or more materials on the surface. These additional functional groups can be functional side groups selected to assist with the self-assembly process.

Alternatively, the substrate surface can have compositions, a surface linker, that bond to the polymer and/or to the inorganic particles such that a composite is bonded to the surface through the polymer or the inorganic particles. For example, the substrate can include organic compositions with one or more functional groups such as halogens, such as Br, CN, $SCOCH_3$, SCN, COOMe, OH, COOH, $SO_3$, $COOCF_3$, olefinic sites, such as vinyl, amines, thiol, phosphonates and suitable combinations of any two or more thereof. In other embodiments, the surface linker has functional groups that react with unreacted functional groups in the polymer. Appropriate functional groups in the surface linker to bond with the polymer can be equivalent to the functional groups in the composite linker to bond with the polymer.

In some embodiments involving self-assembly with particles, such as nanoparticles, a portion of the substrate surface is provided with pores, which can be holes, depressions, cavities or the like. The pores can be in an ordered array or a random arrangement. The size of the pores should be larger than the size of the nanoparticles. Generally, the pores have a diameter less than a micron, although the preferred size of the pores and density of the pores may depend on the particular desired properties of the resulting device. In addition, the spacing between pores can be controlled to be on the order of microns or submicron scales.

To deposit a polymer-inorganic particle blend within the pores, the surface is contacted with a dispersion of the blend. Then, for example, the dispersion is destabilized with respect to the blend, such that the blend tends to settle onto the surface and into the pores. The dispersion can be destabilized by altering the pH, such as adjusting the pH toward the isoelectric point, by diluting surfactants or by adding a cosolvent that results in a less stabile dispersion. The dispersion is removed after the deposition of a desirable amount of the blend. Then, blend on the surface not in the pores can be removed. For example, the surface can be rinsed gently with a dispersant to remove composite on the surface. Alternatively, the surface can be planarized by polishing, such as mechanical polishing or chemical-mechanical polishing. If the dispersant is properly selected to be not too effective at dispersing the blend and if the rinsing is not done too extensively, the blend along the surface can be preferentially removed while leaving the blend within the pores behind.

A porous structure can be formed using anodized aluminum oxide or other metal oxides. Anodized aluminum oxide forms highly oriented and very uniform pores. Pores are formed in anodic aluminum oxide by place an aluminum anode in a solution of dilute acid, such as sulfuric acid, phosphoric acid, or oxalic acid. As the aluminum is oxidized, aluminum oxide with pores is formed. Pore diameters at least can be varied between 4 nm and 200 nm. The pores have a depth on a micron scale. The formation of porous anodized aluminum oxide is described, for example, in D. Al-Mawlawi et al., "Nano-wires formed in anodic oxide nanotemplates," J. Materials Research, 9:1014-1018 (1994) and D. Al-Mawlawi et al., "Electrochemical fabrication of metal and semiconductor nano-wire arrays," in Proc. Symp. Nanostructured Mater. Electrochem., 187th Meeting Electrochem. Soc., Reno, Nev., May 21-26, 1995, Electrochem. Soc. 95(8):262-273 (1995), both of which are incorporated herein by reference. The use of block co-polymers to form ordered array of pores from silica and filling the pores to form a photonic crystal is described in U.S. Pat. No. 6,139,626 to Norris et al., entitled "Three-Dimensionally Patterned Materials and Methods For Manufacturing Same Using Nanocrystals," incorporated herein by reference.

The formation of a plurality of devices on a surface requires the localization of compositions active in the devices within prescribed boundaries associated with the particular device. To localize a structure within prescribed boundaries by self-assembly, the overall procedure generally requires both a process defining the boundaries of the structure and a separate self-assembly process using a chemical affinity to associate the compositions of the device within the boundaries. The boundary defining process generally utilizes external forces to define the extent of the structures. The self-assembly process itself generally does not define the boundaries of the structure. Self-assembly is based on a natural sensing function of the compositions/materials that results in a natural ordering within the resulting structure as the compositions/materials associate. In general, the localization step can be performed before or after the self-assembly process, although the nature of the processing steps may dictate a particular order. The net effect results in a self-assembled structure with a corresponding coverage of polymer/inorganic particle composite within the boundary and an area outside of the boundary lacking this coverage.

The separate boundary defining process is coupled to the self-assembly process by activating the self-assembly process within the boundaries or by deactivating the area outside of the boundaries. Generally, an outside force is applied to perform the activation or deactivation process. The localization can be performed, for example, using a mask or the like, or using maskless lithography with focused radiation, such as an electron beam, an ion beam or a light beam.

The identification of a suitable activation or deactivation technique may depend on the particular self-assembly approach used. The localization approaches generally involve either activation of the area for the placement of the self-assembled structure or by deactivating locations separate from the selected locations. In particular, the localization approach isolates the region for the formation of the self-assembled structure. Suitable physical forces or chemical materials are applied to perform the activation/deactivation.

Various approaches can be adapted for these purposes, including, for example, conventional integrated electronic circuit processing approaches. Specifically, mask techniques can be used to isolate the boundaries of the activation/deactivation process. Radiation or chemical application can be performed in regions defined by the mask. Similarly, focused beams can be used to perform the localization. Suitable focused beams to achieve surface modification include, for example, light beams, such as ultraviolet light or x-ray, laser beams, electron beams or ion beams, which can be focused to impinge on the selected region to perform activation or deactivation. Suitable focusing approaches are known in the art.

An activation process can involve the formation of a specific material at the desired location or the removal of a material or composition that is inhibiting self-assembly at the desired location. Specifically, a particular material can be formed within the boundaries that allows for the self-assembly process to occur within the boundaries, while the surface material outside of the boundaries does not allow for the self-assembly process. For example, a chemically reactive layer can be formed within the boundaries that bind to a polymer, while the substrate surface outside the boundary has a different chemical functionality that does not bind to the polymer. Similarly, a layer of an inhibiting compound can be removed from the area within the boundaries to expose a surface material that binds to a compound required in the self-assembly process, such as a surface linker. The inhibiting compound can be a photoresist compound in some instances that physically blocks the surface and is selectively removable before or after the self-assembly process. The composition of the photoresist or other inhibition compound is selected to inhibit the self-assembly process such that the regions covered by the inhibitory compound surrounding the boundary region subsequently do not become involved in the self-assembly process.

Similarly, the regions outside of the boundary region can be deactivated. For example, a composition that binds a compound involved in the self-assembly process can be applied over an entire surface. Then, the composition can be removed from outside of the bounded region selected for the self-assembly process. Then, the self-assembly process only takes place within the bounded region. In addition, an inhibitor material can be specifically deposited outside of the boundary region so that the self-assembly process only takes place within the bounded region where the inhibitory material has been removed. Similarly, radiation can be used to inactivate or dissociate compounds outside of the bounded region. The mask and/or focused beam approaches described above can be used to perform the deactivation processes. As noted above, strata or layers can be processed to produce a three-dimensional integrated structure.

A localization process used along with self-assembly is described further in commonly assigned U.S. patent application Ser. No. 09/558,266, now U.S. Pat. No. 6,890,624 to Kambe et al., entitled "Self Assembled Structures," incorporated herein by reference.

EXAMPLES

Example 1

Formation of Titanium Oxide Particles

Rutile $TiO_2$, anatase $TiO_2$, and oxygen deficient blue $TiO_2$ particles were produced by laser pyrolysis. The reaction was carried out in a chamber comparable to the chamber shown in FIGS. 24-26.

Figure 24:
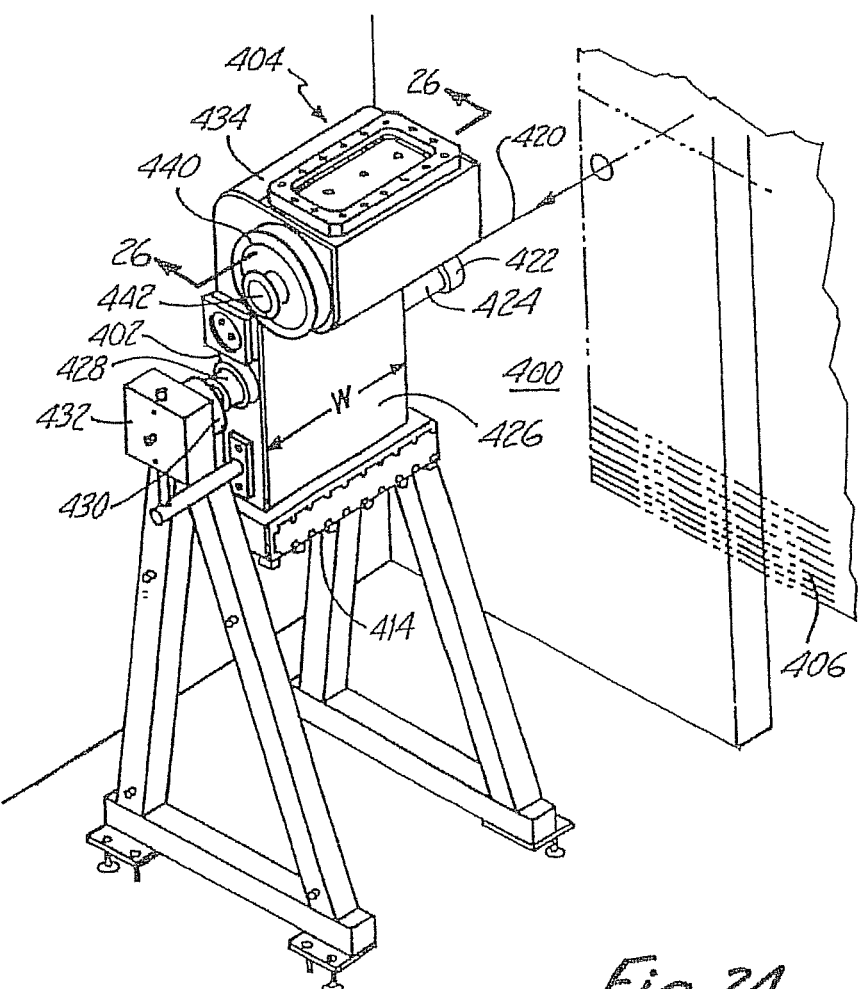
FIG. 24 is a perspective view of a laser pyrolysis apparatus used in the production of titanium oxide.
Figure 25:
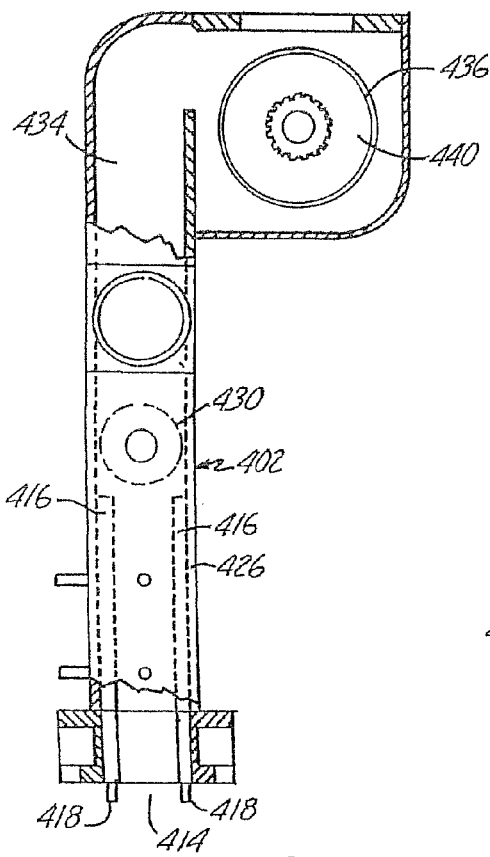
FIG. 25 is a cut away side view of the laser pyrolysis apparatus of FIG. 24.
Figure 26:
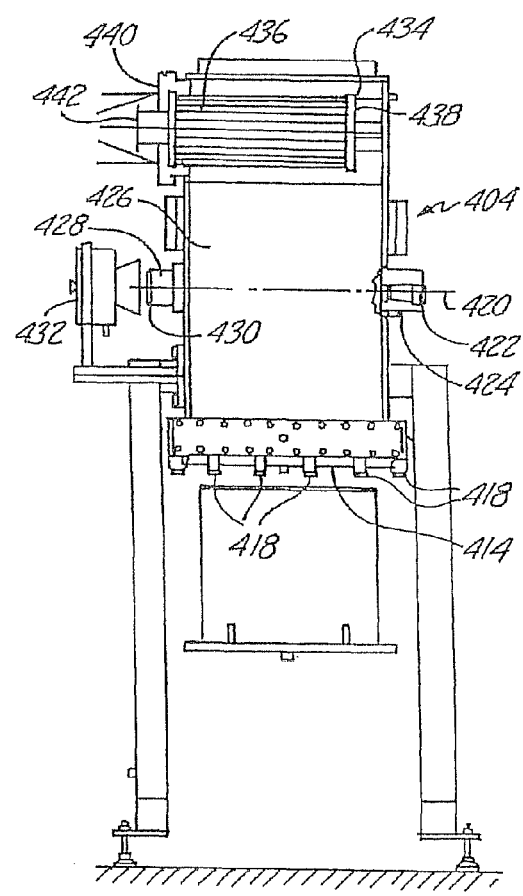
FIG. 26 is a sectional view of the laser pyrolysis apparatus of FIG. 24 taken along line 26-26 of FIG. 24.

Referring to FIGS. 24-26, a pyrolysis reaction system 400 includes reaction chamber 402, a particle collection system 404 and laser 406. Reaction chamber 402 includes reactant inlet 414 at the bottom of reaction chamber 402 where reactant delivery system 408 connects with reaction chamber 402. In this embodiment, the reactants are delivered from the bottom of the reaction chamber while the products are collected from the top of the reaction chamber.

Shielding gas conduits 416 are located on the front and back of reactant inlet 414. Inert gas is delivered to shielding gas conduits 416 through ports 418. The shielding gas conduits direct shielding gas along the walls of reaction chamber 402 to inhibit association of reactant gases or products with the walls.

Reaction chamber 402 is elongated along one dimension denoted in FIG. 24 by "w". A laser beam path 420 enters the reaction chamber through a window 422 displaced along a tube 424 from the main chamber 426 and traverses the elongated direction of reaction chamber 402. The laser beam passes through tube 428 and exits window 430. In one preferred embodiment, tubes 424 and 428 displace windows 422 and 430 about 11 inches from the main chamber. The laser beam terminates at beam dump 432. In operation, the laser beam intersects a reactant stream generated through reactant inlet 414.

The top of main chamber 426 opens into particle collection system 404. Particle collection system 404 includes outlet duct 434 connected to the top of main chamber 426 to receive the flow from main chamber 426. Outlet duct 434 carries the product particles out of the plane of the reactant stream to a cylindrical filter 436. Filter 436 has a cap 438 on one end. The other end of filter 436 is fastened to disc 440. Vent 442 is secured to the center of disc 440 to provide access to the center of filter 436. Vent 442 is attached by way of ducts to a pump. Thus, product particles are trapped on filter 436 by the flow from the reaction chamber 402 to the pump.

Titanium tetrachloride (Strem Chemical, Inc., Newburyport, Mass.) precursor vapor was carried into the reaction chamber by bubbling Ar gas through $TiCl_4$ liquid in a container at room temperature. $C_2H_4$ gas was used as a laser absorbing gas, and argon was used as an inert gas. $O_2$ was used as the oxygen source. Additional argon was added as an inert diluent gas. The reactant gas mixture containing $TiCl_4$, Ar, $O_2$ and $C_2H_4$ was introduced into the reactant gas nozzle for injection into the reactant chamber.

Representative reaction conditions for the production of rutile $TiO_2$ particles and anatase $TiO_2$ particles are described in Table 1. The blue-oxygen deficient rutile $TiO_2$ ($TiO_2$-2) was obtained from the same conditions as the rutile $TiO_2$ particles ($TiO_2$-1) in Table 1, except that they were collected closer to the reaction zone by positioning the particle collector accordingly. Low chamber pressure and low partial pressure of oxygen contribute to the oxygen deficiency in the resulting $TiO_2$. Heating of the particles slightly in air results in the loss of blue color and the formation of a rutile structure. The reason for the color difference is not solely due to level of oxygen content, and currently is not completely understood.

TABLE 1

|  | $TiO_2$-1 | $TiO_2$-3 |
|---|---|---|
| Phase | Rutile $TiO_2$ | Anatase $TiO_2$ |
| BET Surface Area ($m^2$/g) | 64 | 57 |
| Pressure (Torr) | 110 | 150 |
| Ar-Dilution Gas (slm) | 4.2 | 8.4 |
| Ar-Win (slm) | 10.0 | 10.0 |
| Ar-Sld. (slm) | 2.8 | 2.8 |
| Ethylene (slm) | 1.62 | 1.25 |
| Carrier Gas - Ar (slm) | 0.72 | 0.72 |
| Oxygen (slm) | 2.44 | 4.5 |
| Laser Power - Input (Watts) | 1400 | 1507 |
| Laser Power - Out (watts) | 1230 | 1350 | sccm = standard cubic centimeters per minute
slm = standard liters per minute
Argon-Win. = argon flow through inlets 490, 492
Argon-Sld. = argon flow through slots 554, 556

Figure 27:
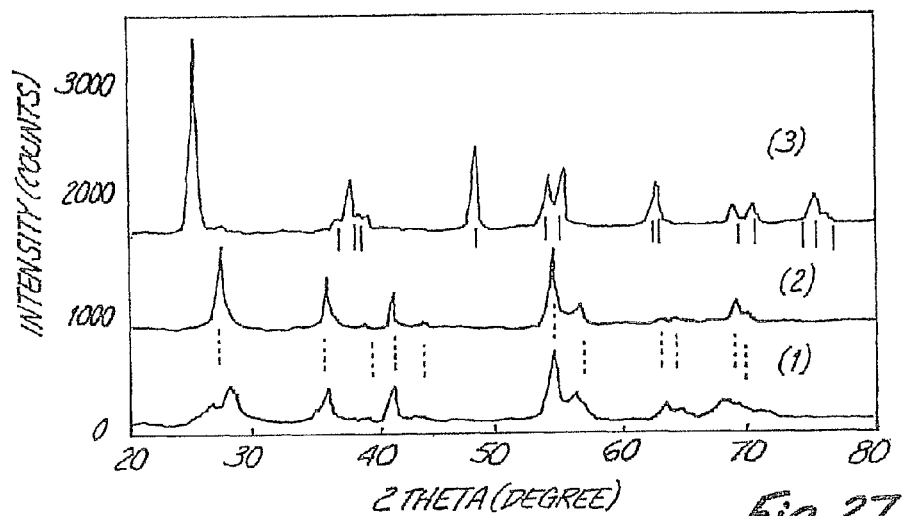
FIG. 27 is a plot of three x-ray diffractograms for each of three different $TiO_2$ powder samples.
Figure 28:
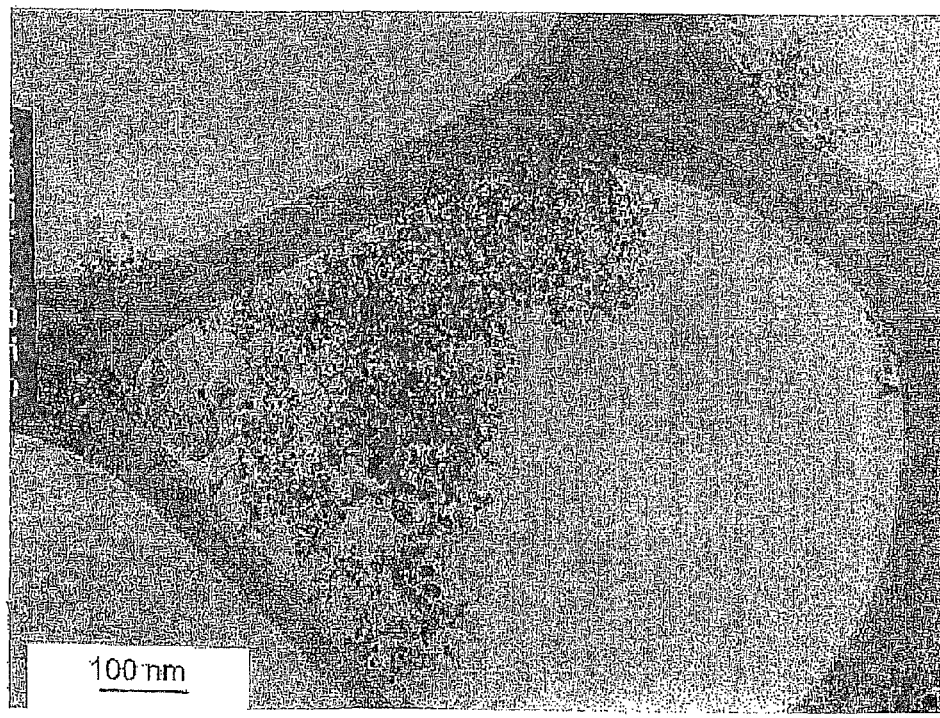
FIG. 28 is a transmission electron micrograph of representative titanium oxide nanoparticles formed by laser pyrolysis.

An x-ray diffractogram of product nanoparticles produced under the conditions in Table 1 are shown in FIG. 27. Sample $TiO_2$-1 had an x-ray diffractogram corresponding to rutile $TiO_2$. Sample $TiO_2$-2 had an x-ray diffractogram similar to sample $TiO_2$-1. Sample $TiO_2$-3 had an x-ray diffractogram corresponding to anatase $TiO_2$. The broadness of the peaks in FIG. 27 indicates that sample 1 is less crystalline than the other two samples. Some peaks in the spectra of sample $TiO_2$-1 seem to originate from amorphous phases. Mixed phase particles can also be produced. FIG. 28 represents a typical transmission electron micrograph (TEM) of the particles. The average particle size $\phi_{av}$ is around 10-20 nm. There are effectively no particles beyond $2\phi_{av}$.

Figure 29:
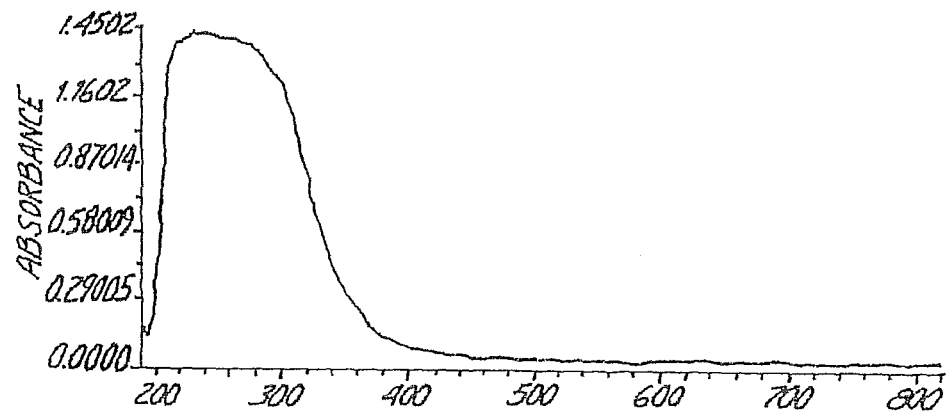
FIG. 29 is a plot of an absorption spectrum in arbitrary units as a function of wavelength for a 0.003 weight percent dispersion of $TiO_2$-3 in ethanol.
Figure 30:
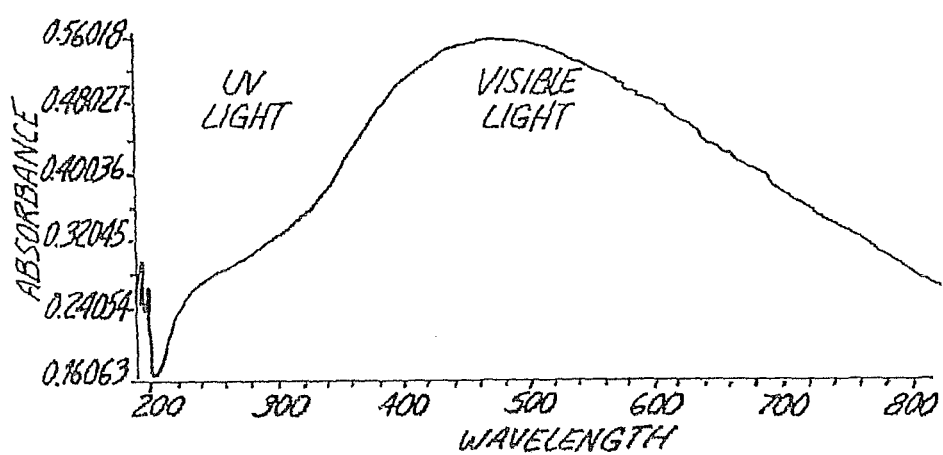
FIG. 30 is a plot of an absorption spectrum in arbitrary units as a function of wavelength for a 0.003 weight percent dispersion of a commercial brand of $TiO_2$ in ethanol.

Optical absorption spectra were obtained for titanium oxide particles in ethanol at a concentration of 0.003 weight percent. The spectra for the $TiO_3$-3 sample is shown in FIG. 29. For comparison, similar spectra were obtained for a commercial $TiO_2$ powders dispersed in ethanol at a concentration of 0.0003 weight percent, which is shown in FIG. 30. The second commercial powder was obtained from Aldrich Chemical Company, Milwaukee, Wis., and had an average particle size of 0.26 microns.

The absorption spectrum of the $TiO_2$ in FIG. 30 is exemplary of bulk $TiO_2$ with a large absorption in the visible and infrared portions of the spectra. In contrast, the absorption spectrum of the powders in FIG. 29 has a very reduced absorption in the visible and infrared portions of the spectra and enhanced absorption in the ultraviolet. This shift and narrowing of the absorption spectra is due to the reduced size of the particles.

Example 2

Nano-Polymer Composites

The formation of composites with poly(acrylic acid) and $TiO_2$-3 powders with silane based linkers is described in this example.

The particles were well suspended in ethanol. Most of the particles remained suspended after 2 weeks. High level of particle dispersion was achieved, which was found significant for developing optical quality nanocomposites. Secondary particle size in the suspensions were evaluated with a Horiba Particle Size Analyzer (Horiba, Kyoto, Japan). Analysis with the particle size analyzer showed good dispersion/low agglomeration.

Surface treatment of the three types of $TiO_2$ particles was performed with aminopropyl triethoxy silane (APTES) as a silylation reagent. APTES is thought to bond to the particles by the following reaction:

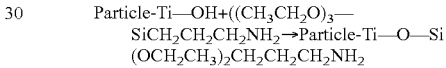

Further successive hydrolysis of the ethoxy groups can form additional Si bonds to the particle through ether-type linkages. Some self-polymerization of the silylation reagent can take place also, especially if excess silylation reagent and water are present. Well-suspended APTES coated $TiO_2$-3 particles were prepared using ethanol as a solvent/dispersant.

Polyacrylic acid was added to the functionalized particles. Generally, the polyacrylic acid had an average molecule weight of 250,000 Daltons, although some samples were prepared with low molecular weight polymer having an average molecular weight of 2,000 Daltons. The polyacrylic acid is thought to react with by way of the carboxylic acid group with the primary amine of the silylation agent to form an amide bond. The first interaction of the polymer with the surface treated particles involves the salt formation of the carboxylic acid with the primary amine. Then, at temperatures of 140°-160° the salt units condense to form amide bonds. This reaction is depicted schematically as follows:

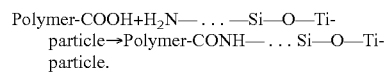

A fourier transform infrared spectrum of the composite had an infrared absorption band at 1664 $cm^{-1}$, which is a frequency characteristic of an amide bond. Scanning electron microscopy (SEM) images confirm the successful synthesis of $TiO_2$-PAA nanocomposites. Also, the composites formed from the functionalized particles exhibited significantly higher thermal stability than corresponding poly-inorganic particle mixtures.

Coatings were formed of the resulting composite by placing drops on a surface. The drops spread on the surface and were allowed to dry. The dried composites were further analyzed. In particular, much smoother materials were formed from the functionalized particles (polymer-inorganic particle composites) than with the unfunctionalized particles (polymer-inorganic particle mixtures).

Example 3

Optical Measurements On PAA-Titania Composites

For the composites formed with polyacrylic acid and titania particles, index-of-refraction as a function of particle loading and optical loss were evaluated.

Refractive index measurements were performed using a Gaertner model L-16C ellipsometer operating at 632.8 nm. Samples with different levels of nanoparticle doping were coated on silicon wafers. Refractive index measurements were performed at incidence angles of 50 and 70 degrees.

Figure 31:
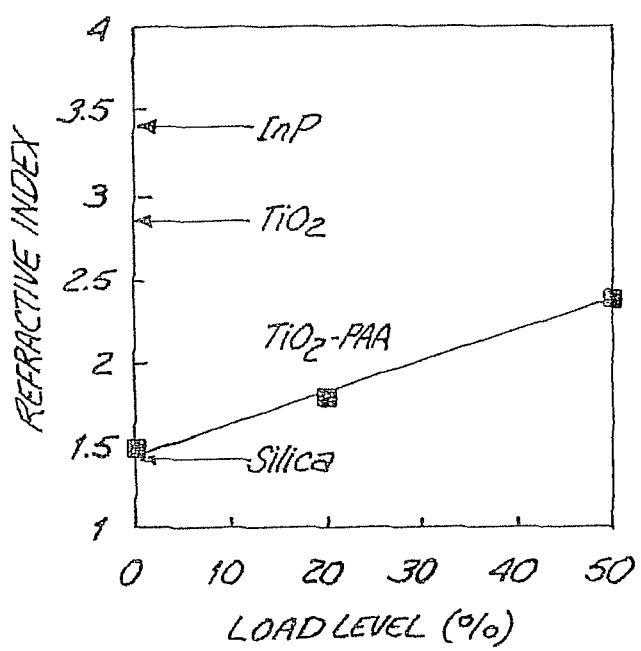
FIG. 31 is a plot of refractive index as a function of particle loading for titanium oxide nanoparticles in poly acrylic acid.

FIG. 31 illustrates evidence of index control that can cover a substantial range based on selection of constituents and particle loadings for polymer-inorganic particle blends, especially composites. Solely by varying a loading level of $TiO_2$ nanoparticles ($n_1$~2.6-2.9 depending on anatase or rutile) in a PAA host ($n_2$~1.48), the index can be controlled by a factor of over 150% with respect to that of the PAA host. All index values are reference to light at 632.8 nm. Appropriate selection of nanoparticles (high index) and polymer host is expected to increase the controllable range of the index.

Optical extinction measurements were performed using a Hewlett Packard model 8452A spectrophotometer. Samples were suspended in ethanol or prepared as films on fused silica substrates. Measurements were performed in a fused silica cuvette with an optical path length of 1 cm. Low optical loss was maintained over a wide range of particle loadings. Even at a 50 weight percent particle loading, the composites were found to have high levels of transparency in the visible and infrared portions of the spectrum. This observation is very significant with respect to application of the composites as a building block for optical network components.

FIGS. 29 and 30, respectively, show optical absorption spectra for nano-$TiO_2$ ($\phi_{av}$~20 nm) and commercial $TiO_2$ particles ($\phi_{av}$~700 nm) both at a concentration of 0.003% by weight in ethanol. The latter scatters visible light far more than the nanoparticles, thereby yielding a higher level of optical attenuation. In addition, nano-$TiO_2$ shows a significant increase in the ultraviolet (UV) light absorption that is considered as a quantum-size effect. This shift in absorption spectrum can be used advantageously in optical materials for transmitting visible or infrared light.

This example demonstrates a capability to control the refractive index of nanoparticles-polymer composites through adjustment of the particle loading. Use of preformed nanoparticles enables a large index contrast between adjacent materials through adjustment of particle loadings, although other materials changes can also be used to establish a large index contrast at an interface with a polymer-inorganic particle blend. A high level of uniformity in nanoparticles as well as excellent dispersion and appropriate surface modification over nanoparticles are useful for the successful synthesis of photonic polymer-inorganic particle blends, such as nanocomposites.

As utilized herein, the term "in the range(s)" or "between" comprises the range defined by the values listed after the term "in the range(s)" or "between", as well as any and all subranges contained within such range, where each such subrange is defined as having as a first endpoint any value in such range, and as a second endpoint any value in such range that is greater than the first endpoint and that is in such range.

The embodiments described above are intended to be illustrative and not limiting. Additional embodiments are within the claims below. Although the present invention has been described with reference to specific embodiments, workers skilled in the art will recognize that changes may be made in form and detail without departing from the spirit and scope of the invention.

What we claim is:

1. A dispersion comprising from about 0.1 wt % to about 20 wt % doped elemental silicon nanoparticles having an average primary particle size of from about 2 nm to about 100 nm and an average secondary particle size of no more than about 250 nm as determined by dynamic light scattering, and a solvent comprising alcohol.

2. The dispersion of claim 1 wherein at least 95 percent of the nanoparticles have a size greater than about 40 percent of the average primary particle size and less than about 160 percent of the average primary particle size.

3. The dispersion of claim 1 wherein the alcohol comprises ethanol.

4. The dispersion of claim 1 further comprising polysiloxane.

5. The dispersion of claim 1 further comprising polyacrylate.

6. The dispersion of claim 1 further comprising a dissolved polymer.

7. The dispersion of claim 1 having an average primary particle size from about 2 nm to about 50 nm.

8. The dispersion of claim 1 wherein the dopant increases the electrical conductivity of the silicon nanoparticles.

9. The dispersion of claim 1 wherein the silicon nanoparticles are crystalline.

10. The dispersion of claim 1 wherein the dispersion is stable.

11. A dispersion comprising from about 0.1 wt % to about 20 wt % doped elemental silicon nanoparticles having an average particle size from about 2 nm to about 100 nm, a solvent comprising alcohol and a polyacrylate or a polysiloxane.

12. The dispersion of claim 11 wherein at least 95 percent of the nanoparticles have a size greater than about 40 percent of the average primary particle size and less than about 160 percent of the average primary particle size.

13. The dispersion of claim 11 wherein the nanoparticles are crystalline.

14. The dispersion of claim 11 wherein the dopant increases the electrical conductivity of the silicon nanoparticles.

15. The dispersion of claim 11 wherein the solvent comprises alcohol.

16. The dispersion of claim 11 wherein the dispersion comprises polysiloxane.

17. The dispersion of claim 16 wherein the polysiloxane comprises amino groups, carboxylic acid groups or combinations thereof.

18. The dispersion of claim 11 wherein the alcohol comprises ethanol.

19. The dispersion of claim 11 wherein the dispersion is stable.

20. The dispersion of claim 11 comprising a combination of polymers.

* * * * *